US008501287B2

(12) United States Patent
Pecorini et al.

(10) Patent No.: US 8,501,287 B2
(45) Date of Patent: Aug. 6, 2013

(54) PLASTIC BABY BOTTLES, OTHER BLOW MOLDED ARTICLES, AND PROCESSES FOR THEIR MANUFACTURE

(75) Inventors: Thomas Joseph Pecorini, Kingsport, TN (US); Spencer Allen Gilliam, Kingsport, TN (US); Alan Keith Phillips, Johnson City, TN (US); Robert Ellis McCrary, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 421 days.

(21) Appl. No.: 12/888,648

(22) Filed: Sep. 23, 2010

(65) Prior Publication Data

US 2011/0042338 A1  Feb. 24, 2011

Related U.S. Application Data

(63) Continuation-in-part of application No. 12/274,692, filed on Nov. 20, 2008, now Pat. No. 8,287,970.

(60) Provisional application No. 60/989,489, filed on Nov. 21, 2007, provisional application No. 61/034,547, filed on Mar. 7, 2008.

(51) Int. Cl.
*C09K 19/00* (2006.01)
*B29C 43/00* (2006.01)
*C08G 63/16* (2006.01)
*C08G 63/54* (2006.01)
*C08G 63/18* (2006.01)
*C08G 63/00* (2006.01)
*C08G 65/48* (2006.01)
*C08L 67/02* (2006.01)
*C08L 69/00* (2006.01)
*C08F 8/00* (2006.01)
*C08F 283/04* (2006.01)

(52) U.S. Cl.
USPC ...... 428/1.33; 428/36.92; 426/117; 215/11.1; 264/500; 528/307; 528/302; 528/304; 528/305; 525/165; 525/173; 525/177; 525/390; 525/397; 525/425; 525/439; 525/444

(58) Field of Classification Search
USPC ............ 428/1.33, 36.92; 426/117; 215/11.1; 264/500; 528/307, 302, 304, 305; 525/165, 525/173, 177, 390, 397, 425, 439, 444
See application file for complete search history.

(56) References Cited

U.S. PATENT DOCUMENTS

| | | |
|---|---|---|
| 1,602,699 A | 10/1926 | Nightingale |
| 2,160,841 A | 6/1939 | Dreyfus |
| 2,202,046 A | 5/1940 | Dreyfus et al. |
| 2,278,537 A | 4/1942 | Dreyfus et al. |
| 2,720,507 A | 10/1955 | Caldwell |
| 2,806,064 A | 9/1957 | McKlveen |
| 2,901,466 A | 8/1959 | Kibler |
| 2,936,324 A | 5/1960 | Hasek et al. |
| 3,000,906 A | 9/1961 | Hasek et al. |
| 3,030,335 A | 4/1962 | Goldberg |
| 3,062,852 A | 11/1962 | Martin et al. |
| 3,075,952 A | 1/1963 | Coover et al. |
| 3,091,600 A | 5/1963 | Caldwell et al. |
| 3,169,121 A | 2/1965 | Goldberg et al. |
| 3,190,928 A | 6/1965 | Elam et al. |
| 3,201,474 A | 8/1965 | Hasek et al. |
| 3,207,814 A | 9/1965 | Goldberg et al. |
| 3,218,372 A | 11/1965 | Okamura et al. |
| 3,227,764 A | 1/1966 | Martin et al. |
| 3,236,899 A | 2/1966 | Clark |
| 3,249,652 A | 5/1966 | Quisenberry |
| 3,259,469 A | 7/1966 | Painter et al. |
| 3,287,390 A | 11/1966 | Poos et al. |
| 3,288,854 A | 11/1966 | Martin |
| 3,312,741 A | 4/1967 | Martin |
| 3,313,777 A | 4/1967 | Elam et al. |
| 3,317,466 A | 5/1967 | Caldwell et al. |
| 3,329,722 A | 7/1967 | Rylander |
| 3,360,547 A | 12/1967 | Wilson et al. |
| 3,366,689 A | 1/1968 | Maeda et al. |
| 3,386,935 A | 6/1968 | Jackson et al. |
| 3,403,181 A | 9/1968 | Painter et al. |
| T858012 I4 | 1/1969 | Caldwell et al. |
| 3,484,339 A | 12/1969 | Caldwell |

(Continued)

FOREIGN PATENT DOCUMENTS

| | | |
|---|---|---|
| BE | 615850 | 4/1962 |
| CA | 2035149 | 8/1991 |

(Continued)

OTHER PUBLICATIONS

Abstract of U.S. Defense Publication T869,015, 869 O.G. 714, Dec. 16, 1969.
Abstract of U.S. Defense Publication T875,010, 875 O.G. 342, Jun. 9, 1970.
Chen et al., "The molecular basis for the relationship between the secondary relaxation and mechanical properties of a series of polyester copolymer glasses," Marcromolecules, 32:5944-5955 (1999).
Coover, H. et al., "Copolyester Molding Compositions," Chemical Abstracts Service, XP002391844.
Kelsey, E. et al., "High Impact, Amorphous Terephthalate Copolyesters of Rigid 2,2,4,4-Tetramethyl-1,3-cyclobutanediol with Flexible Diols," Macromolecules, vol. 33, 2000, pp. 5810-5818, American Chemical Society.
"Plastic Additives Handbook," 5th Edition, 2001, pp. 98-108 and pp. 109-112 (Hanser Gardner Publications, Inc., Cincinnati, OH.

(Continued)

*Primary Examiner* — William Cheung
(74) *Attorney, Agent, or Firm* — Betty Joy Boshears; Jennifer R. Knight

(57) ABSTRACT

The invention is generally directed to baby bottles and other articles produced by blow molding from polymeric materials having glass transition temperatures ranging from 100° C. to 130° C., as well as to processes for producing them. These articles can be exposed to boiling water and can be produced by using a suitable combination of a stretch ratio of less than 3 and a preform temperature at least 20° C. greater than the glass transition temperature (Tg) of the polymeric material.

30 Claims, No Drawings

(56) References Cited

U.S. PATENT DOCUMENTS

| | | |
|---|---|---|
| 3,502,620 A | 3/1970 | Caldwell |
| T873016 I4 | 4/1970 | Gilkey et al. |
| 3,541,059 A | 11/1970 | Schaper |
| 3,546,177 A | 12/1970 | Kibler et al. |
| 3,629,202 A | 12/1971 | Gilkey et al. |
| RE27,682 E | 6/1973 | Schnell et al. |
| 3,772,405 A | 11/1973 | Hamb |
| 3,799,953 A | 3/1974 | Freitag et al. |
| 3,907,754 A | 9/1975 | Tershansy et al. |
| 3,915,913 A | 10/1975 | Jackson, Jr. et al. |
| 3,962,189 A | 6/1976 | Russin et al. |
| 4,001,184 A | 1/1977 | Scott |
| 4,010,145 A | 3/1977 | Russin et al. |
| 4,046,933 A | 9/1977 | Stefanik |
| 4,056,504 A | 11/1977 | Grundmeier et al. |
| 4,084,889 A | 4/1978 | Vischer, Jr. |
| 4,125,572 A | 11/1978 | Scott |
| 4,156,069 A | 5/1979 | Prevorsek et al. |
| 4,160,383 A | 7/1979 | Rauschenberger |
| 4,185,009 A | 1/1980 | Idel et al. |
| 4,188,314 A | 2/1980 | Fox et al. |
| 4,194,038 A | 3/1980 | Baker et al. |
| 4,263,364 A | 4/1981 | Seymour et al. |
| 4,356,299 A | 10/1982 | Cholod et al. |
| 4,367,186 A | 1/1983 | Adelmann et al. |
| 4,379,802 A | 4/1983 | Weaver et al. |
| 4,384,106 A | 5/1983 | Go et al. |
| 4,391,954 A | 7/1983 | Scott |
| 4,424,140 A | 1/1984 | Weinberg et al. |
| 4,426,512 A | 1/1984 | Barbee et al. |
| 4,427,614 A | 1/1984 | Barham et al. |
| 4,430,484 A | 2/1984 | Quinn |
| 4,431,793 A | 2/1984 | Rosenquist |
| 4,452,933 A | 6/1984 | McCready |
| 4,465,820 A | 8/1984 | Miller et al. |
| 4,469,861 A | 9/1984 | Mark et al. |
| 4,480,086 A | 10/1984 | O'Neill |
| 4,525,504 A | 6/1985 | Morris et al. |
| 4,578,295 A | 3/1986 | Jabarin |
| 4,578,437 A | 3/1986 | Light et al. |
| 4,642,959 A | 2/1987 | Swiech, Jr. et al. |
| 4,738,880 A | 4/1988 | Asada et al. |
| 4,749,773 A | 6/1988 | Weaver et al. |
| 4,786,692 A | 11/1988 | Allen et al. |
| 4,816,308 A | 3/1989 | Shimizu et al. |
| 4,826,903 A | 5/1989 | Weaver et al. |
| 4,845,188 A | 7/1989 | Weaver et al. |
| 4,880,592 A | 11/1989 | Martini et al. |
| 4,882,412 A | 11/1989 | Weaver et al. |
| 4,892,922 A | 1/1990 | Weaver et al. |
| 4,892,923 A | 1/1990 | Weaver et al. |
| 4,937,134 A | 6/1990 | Schrenk et al. |
| 4,939,186 A | 7/1990 | Nelson et al. |
| 4,976,057 A | 12/1990 | Bianchi |
| 4,981,898 A | 1/1991 | Bassett |
| 4,985,342 A | 1/1991 | Muramoto et al. |
| 5,017,679 A | 5/1991 | Chang et al. |
| 5,017,680 A | 5/1991 | Sublett |
| 5,034,252 A | 7/1991 | Nilsson et al. |
| 5,104,450 A | 4/1992 | Sand et al. |
| 5,118,760 A | 6/1992 | Blakely et al. |
| 5,118,847 A | 6/1992 | Jackson et al. |
| 5,142,088 A | 8/1992 | Phelps et al. |
| 5,169,994 A | 12/1992 | Sumner, Jr. et al. |
| 5,183,863 A | 2/1993 | Nakamura et al. |
| 5,191,038 A | 3/1993 | Krabbenhoft et al. |
| 5,207,967 A | 5/1993 | Small et al. |
| 5,219,510 A | 6/1993 | Machell et al. |
| 5,224,958 A | 7/1993 | Warunek et al. |
| 5,239,020 A | 8/1993 | Morris |
| 5,256,761 A | 10/1993 | Blount, Jr. |
| 5,258,556 A | 11/1993 | Sumner, Jr. et al. |
| 5,268,219 A | 12/1993 | Harada et al. |
| 5,288,715 A | 2/1994 | Machell et al. |
| 5,288,764 A | 2/1994 | Rotter et al. |
| 5,292,783 A | 3/1994 | Buchanan et al. |
| 5,310,611 A | 5/1994 | Okabe et al. |
| 5,310,787 A | 5/1994 | Kutsuwa et al. |
| 5,326,584 A | 7/1994 | Kamel et al. |
| 5,326,821 A | 7/1994 | Sasaki et al. |
| 5,331,034 A | 7/1994 | Pfahler et al. |
| 5,333,073 A | 7/1994 | Suzuki |
| 5,354,791 A | 10/1994 | Gallucci |
| 5,372,864 A | 12/1994 | Weaver et al. |
| 5,372,879 A | 12/1994 | Handa et al. |
| 5,378,796 A | 1/1995 | George et al. |
| 5,382,292 A | 1/1995 | Conroy et al. |
| 5,384,377 A | 1/1995 | Weaver et al. |
| 5,475,144 A | 12/1995 | Watson et al. |
| 5,480,926 A | 1/1996 | Fagerburg et al. |
| 5,486,562 A | 1/1996 | Borman et al. |
| 5,489,665 A | 2/1996 | Yamato et al. |
| 5,494,992 A | 2/1996 | Kanno et al. |
| 5,498,668 A | 3/1996 | Scott |
| 5,498,688 A | 3/1996 | Oshino et al. |
| 5,506,014 A | 4/1996 | Minnick |
| 5,523,382 A | 6/1996 | Beavers et al. |
| 5,534,609 A | 7/1996 | Lewis et al. |
| 5,552,512 A | 9/1996 | Sublett |
| 5,591,530 A | 1/1997 | Warner et al. |
| 5,633,340 A | 5/1997 | Hoffman et al. |
| 5,650,453 A | 7/1997 | Eckberg et al. |
| 5,654,347 A | 8/1997 | Khemani et al. |
| 5,656,715 A | 8/1997 | Dickerson et al. |
| 5,668,243 A | 9/1997 | Yau et al. |
| 5,681,918 A | 10/1997 | Adams et al. |
| 5,688,874 A | 11/1997 | Hoffman |
| 5,696,176 A | 12/1997 | Khemani et al. |
| 5,705,575 A | 1/1998 | Kelsey |
| 5,783,307 A | 7/1998 | Fagerburg et al. |
| 5,804,617 A | 9/1998 | Hoffman et al. |
| 5,814,679 A | 9/1998 | Eckberg et al. |
| 5,859,116 A | 1/1999 | Shih |
| 5,863,622 A | 1/1999 | Jester |
| 5,902,631 A | 5/1999 | Wang et al. |
| 5,907,026 A | 5/1999 | Factor et al. |
| 5,942,585 A | 8/1999 | Scott et al. |
| 5,955,565 A | 9/1999 | Morris et al. |
| 5,958,539 A | 9/1999 | Eckart et al. |
| 5,958,581 A | 9/1999 | Khanarian et al. |
| 5,959,066 A | 9/1999 | Charbonneau et al. |
| 5,962,625 A | 10/1999 | Yau |
| 5,977,347 A | 11/1999 | Shuto et al. |
| 5,989,663 A | 11/1999 | Morris et al. |
| 6,001,910 A | 12/1999 | Blumenthal et al. |
| 6,005,059 A | 12/1999 | Scott et al. |
| 6,011,124 A | 1/2000 | Scott et al. |
| 6,012,597 A | 1/2000 | Nishihara et al. |
| 6,022,603 A | 2/2000 | Umeda et al. |
| 6,025,061 A | 2/2000 | Khanarian et al. |
| 6,030,671 A | 2/2000 | Yang et al. |
| 6,037,424 A | 3/2000 | Scott et al. |
| 6,043,322 A | 3/2000 | Scott et al. |
| 6,044,996 A | 4/2000 | Carew et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,084,019 A | 7/2000 | Matayabas et al. |
| 6,096,854 A | 8/2000 | Morris et al. |
| 6,114,575 A | 9/2000 | McMahon et al. |
| 6,120,477 A | 9/2000 | Campbell et al. |
| 6,120,889 A | 9/2000 | Turner et al. |
| 6,126,992 A | 10/2000 | Khanarian et al. |
| 6,127,492 A | 10/2000 | Nagashima et al. |
| 6,146,228 A | 11/2000 | Mougin et al. |
| 6,150,494 A | 11/2000 | Wang et al. |
| 6,183,848 B1 | 2/2001 | Turner et al. |
| 6,191,209 B1 | 2/2001 | Andrews et al. |
| 6,211,309 B1 | 4/2001 | McIntosh et al. |
| 6,221,556 B1 | 4/2001 | Gallucci et al. |
| 6,225,436 B1 | 5/2001 | Eiffler et al. |
| 6,232,504 B1 | 5/2001 | Barteau et al. |
| 6,239,910 B1 | 5/2001 | Kim et al. |
| 6,255,523 B1 | 7/2001 | Panandiker et al. |

| | | |
|---|---|---|
| 6,287,656 B1 | 9/2001 | Turner et al. |
| 6,307,006 B1 | 10/2001 | Konig et al. |
| 6,309,718 B1 | 10/2001 | Sprayberry |
| 6,320,042 B1 | 11/2001 | Michihata et al. |
| 6,323,291 B1 | 11/2001 | Mason et al. |
| 6,323,304 B1 | 11/2001 | Lemmon et al. |
| 6,342,304 B1 | 1/2002 | Buchanan et al. |
| 6,352,783 B1 | 3/2002 | Fagerburg |
| 6,354,986 B1 | 3/2002 | Hlavinka et al. |
| 6,359,070 B1 | 3/2002 | Khanarian et al. |
| 6,406,792 B1 | 6/2002 | Briquet et al. |
| 6,437,083 B1 | 8/2002 | Brack et al. |
| 6,448,334 B1 | 9/2002 | Verhoogt et al. |
| 6,458,468 B1 | 10/2002 | Moskala et al. |
| 6,504,002 B1 | 1/2003 | Karlik et al. |
| 6,559,272 B1 | 5/2003 | Jeon et al. |
| 6,573,328 B2 | 6/2003 | Kropp et al. |
| 6,599,994 B2 | 7/2003 | Shelby et al. |
| 6,639,067 B1 | 10/2003 | Brinegar et al. |
| 6,656,577 B1 | 12/2003 | Adelman et al. |
| 6,669,980 B2 | 12/2003 | Hansen |
| 6,723,768 B2 | 4/2004 | Adams et al. |
| 6,733,716 B2 | 5/2004 | Belcher |
| 6,740,377 B2 | 5/2004 | Pecorini et al. |
| 6,773,653 B2 | 8/2004 | Miller et al. |
| 6,818,293 B1 | 11/2004 | Keep et al. |
| 6,818,730 B2 | 11/2004 | Brandenburg et al. |
| 6,846,440 B2 | 1/2005 | Flynn et al. |
| 6,846,508 B1 | 1/2005 | Colas et al. |
| 6,896,966 B2 | 5/2005 | Crawford et al. |
| 6,908,650 B2 | 6/2005 | Odorisio et al. |
| 6,914,120 B2 | 7/2005 | Germroth et al. |
| 7,037,576 B2 | 5/2006 | Willham et al. |
| 7,048,978 B2 | 5/2006 | Tanaka et al. |
| 7,053,143 B2 | 5/2006 | Mori et al. |
| 7,122,661 B2 | 10/2006 | Fleche et al. |
| 7,169,880 B2 | 1/2007 | Shelby et al. |
| 7,297,755 B2 | 11/2007 | Shelby et al. |
| 7,354,628 B2 | 4/2008 | Steube |
| 7,375,154 B2 | 5/2008 | Stafford et al. |
| 7,427,430 B2 | 9/2008 | Rhee et al. |
| 7,468,409 B2 | 12/2008 | Pearson et al. |
| 7,482,397 B2 | 1/2009 | Pearson et al. |
| 7,893,188 B2 | 2/2011 | Crawford et al. |
| 2001/0029324 A1 | 10/2001 | Walker et al. |
| 2001/0031805 A1 | 10/2001 | Buhler |
| 2001/0034419 A1 | 10/2001 | Kanayama et al. |
| 2001/0044003 A1 | 11/2001 | Gallucci et al. |
| 2002/0055586 A1 | 5/2002 | Dalgewicz, III et al. |
| 2002/0128357 A1 | 9/2002 | Goossens et al. |
| 2002/0132963 A1 | 9/2002 | Quillen |
| 2002/0137856 A1 | 9/2002 | Andrews et al. |
| 2002/0188092 A1 | 12/2002 | Moskala et al. |
| 2002/0198297 A1 | 12/2002 | Odorisio et al. |
| 2003/0032737 A1 | 2/2003 | Andrews et al. |
| 2003/0060546 A1 | 3/2003 | Moskala et al. |
| 2003/0075516 A1 | 4/2003 | Rothman et al. |
| 2003/0077546 A1 | 4/2003 | Donovan et al. |
| 2003/0135015 A1 | 7/2003 | Fujimaki et al. |
| 2003/0139497 A1 | 7/2003 | Odorisio et al. |
| 2003/0149177 A1 | 8/2003 | Andrews et al. |
| 2003/0169514 A1 | 9/2003 | Bourdelais et al. |
| 2003/0187151 A1 | 10/2003 | Adams et al. |
| 2003/0195295 A1 | 10/2003 | Mahood et al. |
| 2003/0221716 A1 | 12/2003 | Olson |
| 2003/0229181 A1 | 12/2003 | Hariharan et al. |
| 2004/0022526 A1 | 2/2004 | Kuno et al. |
| 2004/0063864 A1 | 4/2004 | Adams et al. |
| 2004/0101687 A1 | 5/2004 | Crawford et al. |
| 2004/0106707 A1 | 6/2004 | Su et al. |
| 2004/0106767 A1 | 6/2004 | Simon et al. |
| 2004/0108623 A1 | 6/2004 | Deeter et al. |
| 2004/0138381 A1 | 7/2004 | Blasius et al. |
| 2004/0145700 A1 | 7/2004 | Miniutti et al. |
| 2004/0164279 A1 | 8/2004 | Stevenson et al. |
| 2004/0202822 A1 | 10/2004 | Bourdelais et al. |
| 2004/0214984 A1 | 10/2004 | Keep et al. |
| 2005/0008885 A1 | 1/2005 | Blakely et al. |
| 2005/0072060 A1 | 4/2005 | Moncho et al. |
| 2005/0075466 A1 | 4/2005 | Oguro et al. |
| 2005/0096453 A1 | 5/2005 | Flynn et al. |
| 2005/0101759 A1 | 5/2005 | Odorisio et al. |
| 2005/0113556 A1 | 5/2005 | Strand et al. |
| 2005/0119359 A1 | 6/2005 | Shelby et al. |
| 2005/0124779 A1 | 6/2005 | Shelby et al. |
| 2005/0181155 A1 | 8/2005 | Share et al. |
| 2005/0209435 A1 | 9/2005 | Hirokane et al. |
| 2006/0004151 A1 | 1/2006 | Shaikh et al. |
| 2006/0094858 A1 | 5/2006 | Turner et al. |
| 2006/0111481 A1 | 5/2006 | Pearson et al. |
| 2006/0111519 A1 | 5/2006 | Strand et al. |
| 2006/0135668 A1 | 6/2006 | Hayes |
| 2006/0146228 A1 | 7/2006 | Sogo et al. |
| 2006/0151907 A1 | 7/2006 | Kashiwabara |
| 2006/0180560 A1 | 8/2006 | Robinson |
| 2006/0197246 A1 | 9/2006 | Hale et al. |
| 2006/0199904 A1 | 9/2006 | Hale et al. |
| 2006/0199919 A1 | 9/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0270773 A1 | 11/2006 | Hale et al. |
| 2006/0270806 A1 | 11/2006 | Hale |
| 2006/0286329 A1* | 12/2006 | Crawford et al. .......... 428/36.92 |
| 2007/0049667 A1 | 3/2007 | Kim et al. |
| 2007/0071930 A1 | 3/2007 | Shelby et al. |

FOREIGN PATENT DOCUMENTS

| | | |
|---|---|---|
| DE | 29 21 868 A1 | 12/1980 |
| DE | 197 27 709 | 6/1997 |
| DE | 198 11 773 A1 | 9/1999 |
| EP | 0 039 838 A1 | 11/1981 |
| EP | 0 273 144 | 5/1987 |
| EP | 0 282 277 | 9/1988 |
| EP | 0 372 846 | 6/1990 |
| EP | 0 544 008 A1 | 6/1993 |
| EP | 0 595 413 A1 | 5/1994 |
| EP | 0 698 631 | 2/1996 |
| EP | 0 714 764 A2 | 6/1996 |
| EP | 0 902 052 A1 | 3/1999 |
| EP | 0 930 531 A1 | 7/1999 |
| EP | 1 035 167 A | 9/2000 |
| EP | 1 066 825 A1 | 1/2001 |
| EP | 1 674 496 A1 | 6/2006 |
| FR | 1278284 | 12/1961 |
| FR | 1291273 | 5/1965 |
| FR | 1432471 | 2/1966 |
| FR | 1434658 | 2/1966 |
| FR | 2112400 | 6/1972 |
| GB | 962913 | 7/1964 |
| GB | 1041651 | 9/1966 |
| GB | 1044015 | 9/1966 |
| GB | 1047043 | 11/1966 |
| GB | 1090241 | 11/1967 |
| GB | 1130558 | 10/1968 |
| GB | 1 278 284 | 6/1972 |
| GB | 1364732 | 8/1974 |
| GB | 2216919 A | 10/1989 |
| JP | 56-88440 A | 12/1979 |
| JP | 03207743 | 9/1991 |
| JP | 65-01040 | 2/1994 |
| JP | 9-59371 A | 4/1997 |
| JP | 11-222516 | 8/1999 |
| JP | 2001-066701 | 8/1999 |
| JP | 2000-352620 A | 12/2000 |
| JP | 2001-098086 | 4/2001 |
| JP | 2001-214049 | 8/2001 |
| JP | 2003292593 A | 10/2003 |
| JP | 2004-058565 A | 2/2004 |
| JP | 2004-066624 A | 3/2004 |
| JP | 2004-067973 A | 3/2004 |
| JP | 2004-244497 A | 9/2004 |
| JP | 2004-292558 A | 10/2004 |
| JP | 2005-254757 A | 9/2005 |
| JP | 2007-069914 A | 3/2007 |
| JP | 2007-253491 A | 10/2007 |
| KR | 2001-089942 | 10/2001 |

| | | |
|---|---|---|
| KR | 2003-054611 | 7/2003 |
| WO | WO 97/01118 | 1/1997 |
| WO | WO 01/06981 | 2/2001 |
| WO | WO 01/85824 A2 | 11/2001 |
| WO | WO 02/055570 A1 | 7/2002 |
| WO | WO 02/059207 | 8/2002 |
| WO | WO2004/009146 A1 | 1/2004 |
| WO | WO 2004/039860 | 5/2004 |
| WO | WO 2004/104077 A1 | 12/2004 |
| WO | WO 2004/106988 A2 | 12/2004 |
| WO | WO 2005/007735 A2 | 1/2005 |
| WO | WO 2005/026241 A1 | 3/2005 |
| WO | WO 2006/025827 | 3/2006 |
| WO | WO 2006/127755 A2 | 11/2006 |
| WO | WO 2006/127831 A1 | 11/2006 |
| WO | WO 2007/053434 A1 | 5/2007 |
| WO | WO 2007/053548 A2 | 5/2007 |
| WO | WO 2007-053549 A1 | 5/2007 |
| WO | WO 2007-053550 | 5/2007 |
| WO | WO 2007/123631 A | 11/2007 |

OTHER PUBLICATIONS

Bergen, R. L., Jr., "Stress Cracking of Rigid Thermoplastics," SPE Journal, Jun. 1962.
Scheirs, John, et al., "Modern Polyesters: Chemistry and Technology of Polyesters and Copolyesters," Technology & Engineering, 2003, p. 287.
English language Abstract of JP 02-305816 from Patent Abstracts of Japan, Dec. 19, 1990.
English language translation of Belgian Patent No. BE 615,850, Apr. 13, 1962.
English language translation of French Patent No. FR 1,432,471, Feb. 7, 1966.
English language translation of French Patent No. FR 1,434,658, Feb. 28, 1966.
U.S. Appl. No. 11/390,555, filed Mar. 28, 2006, Emmett Dudley Crawford, et al.
U.S. Appl. No. 11/390,563, filed Mar. 28, 2006, Emmett Dudley Crawford, et al.
U.S. Appl. No. 11/390,629, filed Mar. 28, 2006, Emmett Dudley Crawford, et al.
U.S. Appl. No. 11/390,630, filed Mar. 28, 2006, Emmett Dudley Crawford, et al.
U.S. Appl. No. 11/390,631, filed Mar. 28, 2006, Emmett Dudley Crawford, et al.
U.S. Appl. No. 11/390,654, filed Mar. 28, 2006, Emmett Dudley Crawford, et al.
U.S. Appl. No. 11/390,655, filed Mar. 28, 2006, Emmett Dudley Crawford, et al.
U.S. Appl. No. 11/390,671, filed Mar. 28, 2006, Emmett Dudley Crawford, et al.
U.S. Appl. No. 11/390,672, filed Mar. 28, 2006, Emmett Dudley Crawford, et al.
U.S. Appl. No. 11/390,722, filed Mar. 28, 2006, Emmett Dudley Crawford, et al.
U.S. Appl. No. 11/390,750, filed Mar. 28, 2006, Emmett Dudley Crawford, et al.
U.S. Appl. No. 11/390,751, filed Mar. 28, 2006, Emmett Dudley Crawford, et al.
U.S. Appl. No. 11/390,752, filed Mar. 28, 2006, Emmett Dudley Crawford, et al.
U.S. Appl. No. 11/390,773, filed Mar. 28, 2006, Emmett Dudley Crawford, et al.
U.S. Appl. No. 11/390,793, filed Mar. 28, 2006, Emmett Dudley Crawford, et al.
U.S. Appl. No. 11/390,794, filed Mar. 28, 2006, Emmett Dudley Crawford, et al.
U.S. Appl. No. 11/390,809, filed Mar. 28, 2006, Wesley Raymond Hale, et al.
U.S. Appl. No. 11/390,811, filed Mar. 28, 2006, Emmett Dudley Crawford, et al.
U.S. Appl. No. 11/390,812, filed Mar. 28, 2006, Wesley Raymond Hale, et al.
U.S. Appl. No. 11/390,814, filed Mar. 28, 2006, Emmett Dudley Crawford, et al.
U.S. Appl. No. 11/390,826, filed Mar. 28, 2006, Emmett Dudley Crawford, et al.
U.S. Appl. No. 11/390,827, filed Mar. 28, 2006, Emmett Dudley Crawford, et al.
U.S. Appl. No. 11/390,836, filed Mar. 28, 2006, Emmett Dudley Crawford, et al.
U.S. Appl. No. 11/390,846, filed Mar. 28, 2006, Wesley Raymond Hale, et al.
U.S. Appl. No. 11/390,847, filed Mar. 28, 2006, Emmett Dudley Crawford, et al.
U.S. Appl. No. 11/390,853, filed Mar. 28, 2006, Emmett Dudley Crawford, et al.
U.S. Appl. No. 11/390,858, filed Mar. 28, 2006, Emmett Dudley Crawford, et al.
U.S. Appl. No. 11/390,864, filed Mar. 28, 2006, Wesley Raymond Hale, et al.
U.S. Appl. No. 11/390,865, filed Mar. 28, 2006, Emmett Dudley Crawford, et al.
U.S. Appl. No. 11/390,882, filed Mar. 28, 2006, Emmett Dudley Crawford, et al.
U.S. Appl. No. 11/390,883, filed Mar. 28, 2006, Thomas Joseph Pecorini, et al.
U.S. Appl. No. 11/390,908, filed Mar. 28, 2006, Wesley Raymond Hale, et al.
U.S. Appl. No. 11/391,063, filed Mar. 28, 2006, Emmett Dudley Crawford, et al.
U.S. Appl. No. 11/391,124, filed Mar. 28, 2006, Wesley Raymond Hale, et al.
U.S. Appl. No. 11/391,125, filed Mar. 28, 2006, Emmett Dudley Crawford, et al.
U.S. Appl. No. 11/391,137, filed Mar. 28, 2006, Emmett Dudley Crawford, et al.
U.S. Appl. No. 11/391,156, filed Mar. 28, 2006, Emmett Dudley Crawford, et al.
U.S. Appl. No. 11/391,485, filed Mar. 28, 2006, Emmett Dudley Crawford, et al.
U.S. Appl. No. 11/391,495, filed Mar. 28, 2006, Emmett Dudley Crawford, et al.
U.S. Appl. No. 11/391,505, filed Mar. 28, 2006, Emmett Dudley Crawford, et al.
U.S. Appl. No. 11/391,565, filed Mar. 28, 2006, Emmett Dudley Crawford, et al.
U.S. Appl. No. 11/391,571, filed Mar. 28, 2006, Emmett Dudley Crawford, et al.
U.S. Appl. No. 11/391,576, filed Mar. 28, 2006, Emmett Dudley Crawford, et al.
U.S. Appl. No. 11/391,642, filed Mar. 28, 2006, Emmett Dudley Crawford, et al.
U.S. Appl. No. 11/391,659, filed Mar. 28, 2006, Emmett Dudley Crawford, et al.
U.S. Appl. No. 11/588,524, filed Oct. 27, 2006, Emmett Dudley Crawford, et al.
U.S. Appl. No. 11/588,458, filed Oct. 27, 2006, Emmett Dudley Crawford, et al.
U.S. Appl. No. 11/588,907, filed Oct. 27, 2006, Emmett Dudley Crawford, et al.
U.S. Appl. No. 11/588,527, filed Oct. 27, 2006, Emmett Dudley Crawford, et al.
U.S. Appl. No. 11/588,906, filed Oct. 27, 2006, Ted Calvin Germroth, et al.
U.S. Appl. No. 11/588,883, filed Oct. 27, 2006, Ted Calvin Germroth, et al.
U.S. Appl. No. 11/588,554, filed Oct. 27, 2006, Emmett Dudley Crawford, et al.
U.S. Appl. No. 11/635,434, filed Dec. 7, 2006, Emmett Dudley Crawford.
U.S. Appl. No. 11/635,433, filed Dec. 7, 2006, Emmett Dudley Crawford.
U.S. Appl. No. 11/439,062, filed May 23, 2006, Wesley Raymond Hale, et al.

U.S. Appl. No. 11/439,340, filed May 23, 2006, Wesley Raymond Hale.
U.S. Appl. No. 11/706,476, filed Feb. 14, 2007, Leslie Shane Moody, et al.
U.S. Appl. No. 11/706,791, filed Feb. 14, 2007, Leslie Shane Moody, et al.
U.S. Appl. No. 12/091,568, filed Apr. 25, 2008, Emmett Dudley Crawford, et al.
U.S. Appl. No. 12/091,566, filed Apr. 25, 2008, Emmett Dudley Crawford, et al.
U.S. Appl. No. 12/091,570, filed Apr. 25, 2008, Ted Calvin Germroth, et al.
U.S. Appl. No. 12/091,572, filed Apr. 25, 2008, Ted Calvin Germroth, et al.
U.S. Appl. No. 12/294,690, filed Sep. 26, 2008, Ted Calvin Germroth et al.
U.S. Appl. No. 12/294,686, filed Sep. 26, 2008, Ted Calvin Germroth et al.
U.S. Appl. No. 12/274,692, filed Nov. 20, 2008, Thomas Joseph Pecorini et al.
U.S. Appl. No. 12/338,453, filed Dec. 18, 2008, Emmett Dudley Crawford, et al.
U.S. Appl. No. 12/361,779, filed Jan. 29, 2009, Emmett Dudley Crawford.
U.S. Appl. No. 12/365,515, filed Feb. 4, 2009, Emmett Dudley Crawford.
Chapter 4—*Processing of Plastics* in *"Plastics Engineering*, $3^{rd}$ ed", R.J. Crawford, Butterworth-Heinemann Publisher, 1998, Oxford, England, pp. 245-342.
Fox equation (T.G. Fox, Session J, Bull. Am. Phys. Soc., 1, 123 (1956)).
*The Technology of Plasticizers*, by J. Kern Sears and Joseph R Darby, published by Society of Plastic Engineers/Wiley and Sons, New York, 1982; pp. 136-139.
Coleman et al., "Polymer Reviews—A Practical Guide to Polymer Miscibility," *Polymer 31*, pp. 1187-1203 (1990).
"*Hansen Solubility Parameters, a Users Handbook*", by Charles M. Hansen, Chapter 1, CRC Press, 2000, pp. 1-24.
Martinez et al., "*Phase Behavior and Mechanical Properties of Injection Molded Poly (Ethylene Terephthalate ) / Polyarylate Blends*"; Journal of Applied Polymer Science, John Wiley and Sons Inc. New York, US, vol. 45, No. 7, Jul. 5, 1992, p. 1135-1143.
Won Ho Jo et al. : :*Miscibility of poly(ether imide)/poly(ethylene terephthalate) blends*; Polymer Bulletin, Springer, Heidelberg, DE, vol. 33, No. 1, Jun. 1, 1994, p. 113-118 (1994).
Anonymous: "*Poly (ethylene naphthalenedicarboxylate)/polyetherimide blends*" Research Disclosure, Mason Publications, Hampshire, GB, vol. 283, No. 38, Nov. 1987.
ASTM D1525-06, *Standard Test Method for Vicat Softening Temperature of Plastics*, Mar. 15, 2006.
ASTM D648-06, *Standard Test Method for Deflection Temperature of Plastics Under Flexural Load in the Edgewise Position*, Mar. 15, 2006.
ASTM D256-06, *Standard Test Methods for Determining the Izod Pendulum Impact Resistance of Plastics*, Mar. 15, 2006.
ASTM D790-03, *Standard Test Methods for Flexural Properties of Unreinforced and Reinforced Plastics and Electrical Insulating Materials*, Mar. 10, 2003.
ASTM D638-03, *Standard Test Method for Tensile Properties of Plastics*, Dec. 1, 2003.
ASTM D3418-03, *Transition Temperatures and Enthalpies of Fusion and Crystallization of Polymers by Differential Scanning Calorimetry*, Dec. 1, 2003.
C.I. Constitution No. 515240.
C.I. Constitution No. 515245.
Database WPI, Section Ch, Week 200536, Derwent Publications Ltd., London, GB; Class A23, AN 2005-355258, XP002396922 & WO 2005-030833 A1 (Kanebo Ltd) Apr. 7, 2005 abstract.
Shearer, N. H., "T18-Type 1 Polyesters," Mar. 1966, SPE Annual Technical Conference and Exhibition, XP009080224.
Gachter, Muller, "Taschenbuch der Kunststoff-Additive," 1990, Carl Hanser Verlag Munchen Wien, XP02450422, pp. 96-97.
Gachter, Muller, "Kunstoff-Additive," 1990, Carl Hanser Verlag Munchen Wien, XP 02449987, pp. 96-99.
Brown, R., "Taschenbuch Kunstoff-Additive", 1990, Carl Hanswer Verlag Munchen Wiel, XP002455247, pp. 361-363.
Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
USPTO Office Action dated Mar. 11, 2008 for copending U.S. Appl. No. 11/391,642.
USPTO Office Action dated Mar. 24, 2008 for copending U.S. Appl. No. 11/390,908.
USPTO Office Action dated Apr. 15, 2008 for copending U.S. Appl. No. 11/390,629.
USPTO Office Action dated Apr. 16, 2008 for copending U.S. Appl. No. 11/390,751.
USPTO Office Action dated Apr. 17, 2008 for copending U.S. Appl. No. 11/390,814.
USPTO Office Action dated Jun. 3, 2008 for copending U.S. Appl. No. 11/391,063.
USPTO Office Action dated Sep. 10, 2008 for copending U.S. Appl. No. 11/390,752.
USPTO Office Action dated Sep. 10, 2008 for copending U.S. Appl. No. 11/390,794.
USPTO Office Action dated Sep. 19, 2008 for copending U.S. Appl. No. 11/391,565.
USPTO Office Action dated Oct. 2, 2008 for copending U.S. Appl. No. 11/390,671.
USPTO Office Action dated Sep. 24, 2008 for copending U.S. Appl. No. 11/390,631.
USPTO Office Action dated Oct. 1, 2008 for copending U.S. Appl. No. 11/390,655.
USPTO Office Action dated Sep. 29, 2008, for copending U.S. Appl. No. 11/391,137.
USPTO Office Action dated Sep. 9, 2008 for copending U.S. Appl. No. 11/391/571.
USPTO Office Action dated Oct. 22, 2008 for copending U.S. Appl. No. 11/391,125.
USPTO Office Action dated Oct. 20, 2008 for copending U.S. Appl. No. 11/390,672.
USPTO Office Action dated Oct. 8, 2008 for copending U.S. Appl. No. 11/390,853.
USPTO Office Action dated Oct. 9, 2008 for copending U.S. Appl. No. 11/391,505.
USPTO Notice of Allowance dated Oct. 7, 2008 for copending U.S. Appl. No. 11/390,908.
USPTO Office Action dated Oct. 14, 2008 for copending U.S. Appl. No. 11/390,811.
USPTO Office Action dated Oct. 22, 2008 for copending U.S. Appl. No. 11/390,750.
USPTO Office Action dated Oct. 22, 2008 for copending U.S. Appl. No. 11/390,865.
USPTO Office Action dated Oct. 14, 2008 for copending U.S. Appl. No. 11/390,654.
USPTO Office Action dated Oct. 20, 2008 for copending U.S. Appl. No. 11/390,836.
Copending U.S. Appl. No. 12/254,894, filed Oct. 21, 2008, Gary Michael Stack, et al.
Copending U.S. Appl. No. 12/274,692, filed Nov. 20, 2008, Pecorini et al.
Copending U.S. Appl. No. 12/390,694, filed Feb. 23, 2009, Gary Michael Stack.
USPTO Office Action dated Oct. 29, 2008 for copending U.S. Appl. No. 11/390,955.
USPTO Notice of Allowance dated Nov. 3, 2008 for copending U.S. Appl. No. 11/391,642.
USPTO Office Action dated Nov. 3, 2008 for copending U.S. Appl. No. 11/391,485.
USPTO Office Action dated Oct. 29, 2008 for copending U.S. Appl. No. 11/390,864.
USPTO Office Action dated Oct. 30, 2008 for copending U.S. Appl. No. 11/391,495.
USPTO Office Action dated Oct. 31, 2008 for copending U.S. Appl. No. 11/391,156.

USPTO Office Action dated Nov. 3, 2008 for copending U.S. Appl. No. 11/390,883.
USPTO Office Action dated Dec. 19, 2008 for copending U.S. Appl. No. 11/390,751.
USPTO Office Action dated Dec. 31, 2008 for copending U.S. Appl. No. 11/390,827.
USPTO Office Action dated Dec. 31, 2008 for copending U.S. Appl. No. 11/390,826.
USPTO Office Action dated Nov. 14, 2008 for copending U.S. Appl. No. 11/390,630.
USPTO Office Action dated Dec. 19, 2008 for copending U.S. Appl. No. 11/391,576.
USPTO Office Action dated Dec. 19, 2008 for copending U.S. Appl. No. 11/390,629.
USPTO Office Action dated Dec. 31, 2008 for copending U.S. Appl. No. 11/390,773.
USPTO Office Action dated Dec. 12, 2008 for copending U.S. Appl. No. 11/391,063.
USPTO Office Action dated Dec. 19, 2008 for copending U.S. Appl. No. 11/390,814.
USPTO Office Action dated Dec. 31, 2008 for copending U.S. Appl. No. 11/390,722.
USPTO Office Action dated Nov. 14, 2008 for copending U.S. Appl. No. 11/390,882.
USPTO Office Action dated Jan. 29, 2009 for copending U.S. Appl. No. 11/588,524.
USPTO Office Action dated Jan. 30, 2009 for copending U.S. Appl. No. 11/588,458.
USPTO Office Action dated Feb. 2, 2009 for copending U.S. Appl. No. 11/390,853.
USPTO Office Action dated Jan. 21, 2009 for copending U.S. Appl. No. 11/390,847.
USPTO Office Action dated Jan. 12, 2009 for copending U.S. Appl. No. 11/390,858.
USPTO Office Action dated Jan. 26, 2009 for copending U.S. Appl. No. 11/391,659.
USPTO Office Action dated Jan. 26, 2009 for copending U.S. Appl. No. 11/588,554.
USPTO Office Action dated Feb. 3, 2009 for copending U.S. Appl. No. 11/391,505.
USPTO Office Action dated Feb. 10, 2009 for copending U.S. Appl. No. 11/390,865.
USPTO Office Action dated Feb. 12, 2009 for copending U.S. Appl. No. 11/439,062.
USPTO Office Action dated Feb. 13, 2009 for copending U.S. Appl. No. 11/439,340.
USPTO Office Action dated Feb. 25, 2009 for copending U.S. Appl. No. 11/588,907.
USPTO Office Action dated Feb. 25, 2009 for copending U.S. Appl. No. 11/588,527.
USPTO Office Action dated Feb. 27, 2009 for copending U.S. Appl. No. 11/390,955.
USPTO Office Action dated Feb. 25, 2009 for copending U.S. Appl. No. 11/588,906.
USPTO Office Action dated Feb. 25, 2009 for copending U.S. Appl. No. 11/588,883.
USPTO Office Action dated Mar. 5, 2009 for copending U.S. Appl. No. 11/390,864.
USPTO Office Action dated Mar. 6, 2009 for copending U.S. Appl. No. 11/391,156.
USPTO Office Action dated Feb. 25, 2009 for copending U.S. Appl. No. 11/390,811.
USPTO Office Action dated Feb. 27, 2009 for copending U.S. Appl. No. 11/390,654.
USPTO Office Action dated Feb. 27, 2009 for copending U.S. Appl. No. 11/390,836.
USPTO Office Action dated Mar. 13, 2009 for copending U.S. Appl. No. 11/390,883.
USPTO Office Action dated Mar. 11, 2009 for copending U.S. Appl. No. 11/390,630.
USPTO Office Action dated Mar. 9, 2009 for copending U.S. Appl. No. 11/391,495.
USPTO Office Action dated Mar. 9, 2009 for copending U.S. Appl. No. 11/390,750.
USPTO Office Action dated Mar. 16, 2009 for copending U.S. Appl. No. 11/390,882.
USPTO Office Action dated Apr. 27, 2009 for copending U.S. Appl. No. 11/390,655.
USPTO Office Action dated Apr. 27, 2009 for copending U.S. Appl. No. 11/391,137.
USPTO Office Action dated Mar. 16, 2009 for copending U.S. Appl. No. 11/391,485.
USPTO Office Action dated Apr. 15, 2009 for copending U.S. Appl. No. 12/091,566.
USPTO Notice of Allowance dated Apr. 13, 2009 for copending U.S. Appl. No. 11/391,063.
USPTO Office Action dated Apr. 16, 2009 for copending U.S. Appl. No. 12/091,570.
USPTO Office Action dated Apr. 17, 2009 for copending U.S. Appl. No. 11/390,671.
USPTO Office Action dated Apr. 17, 2009 for copending U.S. Appl. No. 11/391,565.
USPTO Office Action dated Apr. 20, 2009 for copending U.S. Appl. No. 11/390,631.
USPTO Office Action dated Mar. 31, 2009 for copending U.S. Appl. No. 11/390,563.
USPTO Office Action dated Apr. 2, 2009 for copending U.S. Appl. No. 11/390,793.
USPTO Office Action dated Mar. 23, 2009 for copending U.S. Appl. No. 11/390,752.
USPTO Office Action dated Mar. 23, 2009 for copending U.S. Appl. No. 11/390,794.
USPTO Office Action dated May 13, 2009 for copending U.S. Appl. No. 12/361,779.
USPTO Office Action dated May 13, 2009 for copending U.S. Appl. No. 12/365,515.
USPTO Office Action dated May 21, 2009 for copending U.S. Appl. No. 11/706,476.
USPTO Office Action dated May 22, 2009 for copending U.S. Appl. No. 11/706,791.
USPTO Office Action dated May 18, 2009 for copending U.S. Appl. No. 11/391,505.
USPTO Office Action dated Apr. 14, 2009 for copending U.S. Appl. No. 11/635,434.
USPTO Office Action dated Apr. 14, 2009 for copending U.S. Appl. No. 11/635,433.
USPTO Office Action dated May 18, 2009 for copending U.S. Appl. No. 11/390,846.
USPTO Office Action dated Jun. 11, 2009 for copending U.S. Appl. No. 11/390,809.
USPTO Office Action dated Jul. 2, 2009 for copending U.S. Appl. No. 11/390,827.
USPTO Office Action dated Aug. 7, 2009 for copending U.S. Appl. No. 11/390,773.
USPTO Office Action dated Aug. 27, 2009 for copending U.S. Appl. No. 11/390,826.
USPTO Office Action dated Aug. 10, 2009 for copending U.S. Appl. No. 11/390,722.
Dixon, E.R. et al., "The Inter-Relation of Some Mechanical Properties with Molecular Weight and Crystallinity in Poly(ethylene terephthalate)", 1968, pp. 464-470, Journal of Materials Science, vol. 3.
USPTO Office Action dated Sep. 4, 2009, for copending U.S. Appl. No. 11/391,124.
USPTO Office Action dated Sep. 10, 2009 for copending U.S. Appl. No. 11/390,812.
New Copending U.S. Appl. No. 12/479,893, filed Jun. 8, 2009, Emmett Dudley Crawford, et al.
USPTO Office Action dated Sep. 14, 2009 for copending U.S. Appl. No. 11/391,576.
Ellis, Thomas S., "Miscibility of Polyamide Blends: Effects of Configuration," 1995, Polymer, vol. 36, Issue 20, pp. 3919-3926.
Buschow, K.H.J., et al., "Packaging: Papers for Sacks and Bags," 2001, Encyclopedia of Materials: Science and Technology, vol. 8, Elsevier, pp. 6646-6652.

Coles, Richard, et al., "Food Packaging Technology," 2003, pp. 194-195 and 224-229, Blackwell Publishing.
Sajiki, Junko, et al., "Leaching of Bisphenol A (BPA) to Seawater from Polycarbonate Plastic and its Degradation by Reactive Oxygen Species," 2003, Chemosphere, 51, pp. 55-62.
USPTO Office Action dated Oct. 2, 2009 for copending U.S. Appl. No. 11/588,524.
USPTO Office Action dated Oct. 7, 2009 for copending U.S. Appl. No. 11/588,458.
USPTO Office Action dated Sep. 29, 2009 for copending U.S. Appl. No. 11/390,751.
USPTO Office Action dated Sep. 24, 2009 for copending U.S. Appl. No. 11/588,883.
USPTO Office Action dated Sep. 28, 2009 for copending U.S. Appl. No. 11/390,847.
USPTO Office Action dated Sep. 24, 2009 for copending U.S. Appl. No. 11/390,858.
USPTO Office Action dated Sep. 29, 2009 for copending U.S. Appl. No. 11/390,629.
USPTO Office Action dated Sep. 29, 2009 for copending U.S. Appl. No. 11/390,814.
USPTO Office Action dated Oct. 19, 2009 for copending U.S. Appl. No. 11/390,563.
USPTO Office Action dated Oct. 20, 2009 for copending U.S. Appl. No. 11/588,907.
USPTO Office Action dated Oct. 21, 2009 for copending U.S. Appl. No. 11/391,156.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
USPTO Office Action dated Oct. 22, 2009 for copending U.S. Appl. No. 11/588,906.
USPTO Office Action dated Nov. 3, 2009 for copending U.S. Appl. No. 11/390,883.
USPTO Office Action dated Nov. 4, 2009 for copending U.S. Appl. No. 11/390,750.
USPTO Office Action dated Nov. 4, 2009 for copending U.S. Appl. No. 11/390,864.
USPTO Office Action dated Nov. 17, 2009 for copending U.S. Appl. No. 12/254,894.
USPTO Office Action dated Nov. 18, 2009 for copending U.S. Appl. No. 11/390,630.
USPTO Office Action dated Nov. 30, 2009 for copending U.S. Appl. No. 11/391,495.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
USPTO Office Action dated Nov. 18, 2009 for copending U.S. Appl. No. 11/390,794.
USPTO Office Action dated Nov. 20, 2009 for copending U.S. Appl. No. 11/391,485.
USPTO Office Action dated Nov. 20, 2009 for copending U.S. Appl. No. 11/390,882.
USPTO Office Action dated Dec. 1, 2009 for copending U.S. Appl. No. 12/091,570.
USPTO Office Action dated Dec. 3, 2009 for copending U.S. Appl. No. 11/395,505.
USPTO Office Action dated Dec. 4, 2009 for copending U.S. Appl. No. 12/091,566.
Zipper, Marcus D.,et al., "A Free Volume Study of Miscible Polyester Blends," 1995, pp. 127-136, Polymer International, vol. 36.
"APEC High-Heat Polycarbonate Resin," 2004, Bayer Material Science Product Information *Not Prior Art; Submitted for State of the Art*.
Lobo, Hubert et al, "Handbook of Plastics Analysis," 2003, pp. 20 and 21, Marcel Dekker, Inc.
Turner, S.R., et al. "Amorphous and Crystalline Polyesters based on 1,4-Cyclohexanedimethanol," 2003, *Modern Polyesters: Chemistry and Technology of Polyesters and Copolyesters*, pp. 268, 284-285, J. Sheirs and T.E. Long, ed., John Wiley and Sons, Ltd.

USPTO Notice of Allowance dated Dec. 11, 2009 for copending U.S. Appl. No. 12/365,515.
USPTO Office Action dated Dec. 18, 2009 for copending U.S. Appl. No. 11/390,846.
Copending U.S. Appl. No. 12/639,324, filed Dec. 16, 2009.
USPTO Notice of Allowance dated Dec. 22, 2009 for copending U.S. Appl. No. 12/361,779.
USPTO Office Action dated Jan. 7, 2010 for copending U.S. Appl. No. 12/091,568.
USPTO Office Action dated Jan. 13, 2010 for copending U.S. Appl. No. 11/635,433.
USPTO Office Action dated Jan. 14, 2010 for copending U.S. Appl. No. 11/390,809.
USPTO Notice of Allowance dated Jan. 27, 2010 for copending U.S. Appl. No. 11/635,434.
USPTO Office Action dated Mar. 11, 2010, for copending U.S. Appl. No. 11/391,124.
Copending U.S. Appl. No. 12/724,492, filed Mar. 16, 2010.
Copending U.S. Appl. No. 12/724,480, filed Mar. 16, 2010.
Copending U.S. Appl. No. 12/724,468, filed Mar. 16, 2010.
USPTO Office Action dated Mar. 19, 2010, for copending U.S. Appl. No. 11/588,527.
USPTO Notice of Allowance dated Mar. 24, 2010 for copending U.S. Appl. No. 11/391,565.
USPTO Office Action dated Mar. 29, 2010 for copending U.S. Appl. No. 11/390,812.
USPTO Notice of Allowance dated Apr. 15, 2010 for copending U.S. Appl. No. 11/391,505.
USPTO Office Action dated Apr. 19, 2010 for copending U.S. Appl. No. 12/724,480.
USPTO Office Action dated Apr. 21, 2010 for copending U.S. Appl. No. 12/724,468.
USPTO Office Action dated Apr. 21, 2010 for copending U.S. Appl. No. 12/724,492.
USPTO Office Action dated May 6, 2010 for copending U.S. Appl. No. 12/254,894.
New copending 12/784,193, filed May 20, 2010, Emmett Dudley Crawford, et al.
USPTO Notice of Allowance dated May 13, 2010 for copending U.S. Appl. No. 11/390,629.
USPTO Notice of Allowance dated May 13, 2010 for copending U.S. Appl. No. 11/390,751.
USPTO Notice of Allowance dated May 21, 2010 for copending U.S. Appl. No. 11/391,156.
USPTO Notice of Allowance dated May 26, 2010 for copending U.S. Appl. No. 11/391,495.
USPTO Notice of Allowance dated Jun. 24, 2010 for copending U.S. Appl. No. 11/391,576.
USPTO Office Action dated Jun. 24, 2010 for copending U.S. Appl. No. 11/390,846.
USPTO Office Action dated Jul. 8, 2010 for copending U.S. Appl. No. 11/390,809.
USPTO Notice of Allowance dated Jul. 8, 2010 for copending U.S. Appl. No. 11/390,630.
USPTO Notice of Allowance dated Jul. 8, 2010 for copending U.S. Appl. No. 11/390,883.
USPTO Office Action dated Jul. 12, 2010 for copending U.S. Appl. No. 11/390,794.
Notice of Allowance dated Jul. 13, 2010 for copending U.S. Appl. No. 11/391,505.
USPTO Office Action dated Jul. 22, 2010 for copending U.S. Appl. No. 12/479,893.
USPTO Notice of Allowance dated Jul. 22, 2010 for copending U.S. Appl. No. 11/391,485.
USPTO Notice of Allowance dated Aug. 3, 2010 for copending U.S. Appl. No. 11/390,864.
USPTO Office Action dated Aug. 6, 2010 for copending U.S. Appl. No. 11/773,275.
New copending U.S. Appl. No. 12/853,717, filed Aug. 10, 2010, Emmett Dudley Crawford, et al.
USPTO Notice of Allowance dated Aug. 11, 2010 for copending U.S. Appl. No. 11/390,631.

USPTO Notice of Allowance dated Sep. 2, 2010 for copending U.S. Appl. No. 11/390,811.
USPTO Office Action dated Sep. 2, 2010 for copending U.S. Appl. No. 11/391,124.
USPTO Office Action dated Oct. 5, 2010 for copending U.S. Appl. No. 11/390,655.
New copending U.S. Appl. No. 12/900,060, filed Oct. 7, 2010, Thomas Joseph Pecorini, et al.
USPTO Office Action dated Oct. 8, 2010 for copending U.S. Appl. No. 11/390,812.
USPTO Notice of Allowance dated Oct. 28, 2010 for copending U.S. Appl. No. 11/390,827.
USPTO Office Action dated Oct. 27, 2010 for copending U.S. Appl. No. 12/294,690.
New Copending U.S. Appl. No. 12/900,060, filed Oct. 7, 2010, Joseph Thomas Pecorini.
USPTO Notice of Allowance dated Oct. 14, 2010 for copending U.S. Appl. No. 11/390,722.
USPTO Notice of Allowance dated Nov. 2, 2010 for copending U.S. Appl. No. 12/724,480.
USPTO Notice of Allowance dated Nov. 4, 2010 for copending U.S. Appl. No. 12/724,468.
USPTO Notice of Allowance dated Nov. 4, 2010 for copending U.S. Appl. No. 11/390,955.
USPTO Office Action dated Nov. 4, 2010 for copending U.S. Appl. No. 12/294,686.
USPTO Notice of Allowance dated Nov. 4, 2010 for copending U.S. Appl. No. 11/390,826.
USPTO Office Action dated Oct. 27, 2010 for copending U.S. Appl. No. 11/390,836.
USPTO Notice of Allowance dated Nov. 23, 2010 for copending U.S. Appl. No. 11/390,563.
New copending U.S. Appl. No. 12/943,217, filed Nov. 10, 2010, Emmett Dudley Crawford et al.
New copending U.S. Appl. No. 12/963,703, filed Dec. 9, 2010.
New copending U.S. Appl. No. 12/963,698, filed Dec. 9, 2010.
New copending U.S. Appl. No. 13/007,838, filed Jan. 17, 2011, Emmett Dudley Crawford et al.
USPTO Office Action dated Jan. 24, 2011 for copending U.S. Appl. No. 11/773,275.
New copending U.S. Appl. No. 13/016,147, filed Jan. 28, 2011, Emmett Dudley Crawford, et al.
New copending U.S. Appl. No. 13/017,069, filed Jan. 31, 2011, Emmett Dudley Crawford, et al.
New Copending U.S. Appl. No. 13/017,352, filed Jan. 31, 2011, Emmett Dudley Crawford, et al.
USPTO Office Action dated Jan. 25, 2011 for copending U.S. Appl. No. 12/853,717.
Al-Malaika, S., "Stabilization", Encyclopedia of Polymer Science and Technology, vol. 4, 2001, pp. 179-229, John Wiley & Sons, Inc.
USPTO Notice of Allowance dated Jan. 26, 2011 for copending U.S. Appl. No. 11/390,858.
USPTO Office Action dated Feb. 2, 2011 for copending U.S. Appl. No. 11/390,655.
USPTO Office Action dated Mar. 17, 2011 for copending U.S. Appl. No. 12/479,893.
USPTO Notice of Allowance dated Mar. 17, 2011 for copending U.S. Appl. No. 11/391,137.
USPTO Office Action dated Feb. 14, 2011 for copending U.S. Appl. No. 12/294,690.
USPTO Notice of Allowance dated Feb. 18, 2011 for copending U.S. Appl. No. 11/390,809.
USPTO Notice of Allowance dated Feb. 17, 2011 for copending U.S. Appl. No. 11/390,812.
USPTO Office Action dated Jun. 2, 2011 for copending U.S. Appl. No. 12/338,453.
USPTO Office Action dated Jun. 16, 2011 for copending U.S. Appl. No. 12/390,694.
USPTO Notice of Allowance dated Aug. 12, 2011 for copending U.S. Appl. No. 11/390,752.
USPTO Office Action dated Jul. 19, 2011 for copending U.S. Appl. No. 11/390,794.
USPTO Notice of Allowance dated Jul. 21, 2011 for copending U.S. Appl. No. 11/390,671.
USPTO Notice of Allowance dated Aug. 3, 2011 for copending U.S. Appl. No. 11/390,655.
New copending U.S. Appl. No. 13/162,870, filed Jun. 17, 2011, Emmett Dudley Crawford, et al.
USPTO Office Action dated Jul. 7, 2011 for copending U.S. Appl. No. 11/588,906.
USPTO Office Action dated Jun. 22, 2011 for copending U.S. Appl. No. 12/091,570.
USPTO Office Action dated Jun. 8, 2011 for copending U.S. Appl. No. 11/588,883.
USPTO Office Action dated Aug. 17, 2011 for copending U.S. Appl. No. 12/274,692.
New copending application U.S. Appl. No. 13/215,511, filed Aug. 23, 2011, Emmett Dudley Crawford, et al.
USPTO Office Action dated Sep. 14, 2011 for copending U.S. Appl. No. 13/017,069.
USPTO Notice of Allowance dated Sep. 16, 2011 for copending U.S. Appl. No. 11/390,671.
USPTO Notice of Allowance dated Sep. 16, 2011 for copending U.S. Appl. No. 12/784,193.
USPTO Office Action dated Oct. 17, 2011 for copending U.S. Appl. No. 12/853,717.
USPTO Notice of Allowance dated Oct. 17, 2011 for copending U.S. Appl. No. 11/390,794.
USPTO Notice of Allowance dated Oct. 25, 2011 for copending U.S. Appl. No. 12/900,060.
USPTO Office Action dated Oct. 31, 2011 for copending U.S. Appl. No. 12/639,324.
USPTO Office Action dated Nov. 2, 2011 for copending U.S. Appl. No. 12/479,893.
USPTO Notice of Allowance dated Nov. 2, 2011 for copending U.S. Appl. No. 12/390,694.
USPTO Notice of Allowance dated Nov. 10, 2011 for copending U.S. Appl. No. 12/943,217.
USPTO Notice of Allowance dated Dec. 20, 2011 for copending U.S. Appl. No. 12/390,694.
USPTO Office Action dated Dec. 21, 2011 for copending U.S. Appl. No. 12/091,570.
New copending U.S. Appl. No. 13/348,677, filed Jan. 12, 2012, Emmett Dudley Crawford, et al.
USPTO Notice of Allowance dated Feb. 14, 2012 for copending U.S. Appl. No. 11/588,906.
New copending U.S. Appl. No. 13/398,262, filed Feb. 26, 2012, Emmett Dudley Crawford et al.
Notice of Allowance and Fee(s) Due mailing date Jan. 24, 2013 received in co-pending U.S. Appl. No. 13/215,511.
Notice of Allowance and Fee(s) Due mailing date Nov. 23, 2012 received in co-pending U.S. Appl. No. 13/348,677.
USPTO Office Action dated Dec. 7, 2012 for co-pending U.S. Appl. No. 13/398,262.
USPTO Notice of Allowance dated Nov. 28, 2011 for copending U.S. Appl. No. 12/274,692.
Notice of Allowance and Fee(s) Due mailing date Jul. 18, 2012 received in co-pending U.S. Appl. No. 13/348,677.
Notice of Allowance and Fee(s) Due mailing date Jun. 21, 2012 received in co-pending U.S. Appl. No. 12/091,570.
Notice of Allowance and Fee(s) Due mailing date Jun. 11, 2012 received in co-pending U.S. Appl. No. 12/274,692.
Office Action notification date May 21, 2012 received in co-pending U.S. Appl. No. 13/215,511.
USPTO Notice of Allowance dated Sep. 28, 2012 for co-pending U.S. Appl. No. 13/016,147.
New co-pending U.S. Appl. No. 13/596,754, filed Aug. 28, 2012; Thomas Joseph Pecorini et al.
New co-pending U.S. Appl. No. 13/596,805, filed Aug. 28, 2012; Ted Calvin Germroth et al.
C.I. Constitution No. 515245 Nov. 6, 2006.
C.I. Constitution No. 515240 Nov. 6, 2006.

* cited by examiner

PLASTIC BABY BOTTLES, OTHER BLOW MOLDED ARTICLES, AND PROCESSES FOR THEIR MANUFACTURE

CROSS-REFERENCES TO RELATED APPLICATIONS

This application is a continuation-in-part of application Ser. No. 12/274,692, entitled "Plastic Baby Bottles, Other Blow Molded Articles, and Processes for Their Manufacture" filed on Nov. 20, 2008, now U.S. Pat. No. 8,287,970, which claims the benefit of 35 U.S.C. §119(e) to: U.S. Provisional Application Ser. No. 60/989,489 filed on Nov. 21, 2007; U.S. Provisional Application Ser. No. 61/034,547, filed on Mar. 7, 2008; and also is a Continuation-in-part and claims the priority to U.S. application Ser. No. 11/390,827, filed on Mar. 28, 2006, all of which are hereby incorporated by this reference in their entireties.

FIELD OF THE INVENTION

The invention is generally directed to baby bottles and other articles produced by blow molding from polymeric materials having glass transition temperatures ranging from 100° C. to 130° C. as well as to processes for producing them.

BACKGROUND OF THE INVENTION

Plastic is a popular material used to make baby bottles and other infant care products that are both transparent and shatter resistant. Typically, baby bottles are sterilized prior to use by immersion in boiling water or by exposure to the steam of boiling water. Times of exposure are typically 5-20 minutes, but exposures for up to an hour, and even longer, are possible. Conventional bottles made using common clear plastic materials, such as poly(ethylene terephthalate) ("PET"), typically lose their shape during sterilization due to the low glass transition temperature (Tg) of these materials relative to boiling water. Thus, plastics with higher Tg values, such as bisphenol-A polycarbonate, amorphous polyamide, and polysulfone, are commonly used to fabricate baby bottles.

Most baby bottles are produced by blow molding, which restricts the materials used in baby bottles to high Tg plastic materials. Blow molding typically involves the injection molding of a preform in an injection mold, followed by pressurized-air inflation of this preform at a warm temperature in a blow mold. The bottle is then quenched below the Tg of the material by contact with the blow mold. This quenching after inflation, however, traps molecular orientation into the sidewalls of the bottle that can be released during boiling-water sterilization, causing the bottle to distort or shrink. In order to prevent shrinkage during boiling water sterilization, the Tg of plastics currently employed in the prior art to produce blow molded baby bottles is at least 30° C. above boiling water, that is, at least 130° C.

These high Tg materials also have certain deficiencies, such as cost, unfavorable consumer perception because of the presence of bisphenol A, insufficient chemical resistance, insufficient hydrolytic stability, etc, which can limit their use in these applications. Thus, there is a need in the industry for baby bottles produced from alternative plastic materials.

SUMMARY OF THE INVENTION

The present disclosure is generally directed to baby bottles and other articles produced by blow molding from polymeric materials having glass transition temperatures ranging from 100° C. to 130° C., as well as to processes for producing them. These articles can be produced by a suitable combination of stretch ratio and process conditions during blow molding and are capable of being exposed to boiling water (for the first time) without exhibiting detrimental shrinking or distortion.

In one aspect of the invention, there is provided a baby bottle (or other blow molded article) having a shrinkage of 5% or less after initial immersion in boiling water for one hour, comprising a polymeric material having a Tg of from 100° C. to 130° C.

In one aspect of the invention, there is provided a blow molded bottle (or other blow molded article) formed of a polymeric material, wherein said polymeric material comprises terephthalic acid residues, 2,2,4,4-tetramethyl-1,3-cyclobutanediol residues, and 1,4-cyclohexanedimethanol residues, wherein said polymeric material has a Tg from 100° C. to 130° C., wherein said bottle (or other blow molded article) displays shrinkage of 5% or less after initial immersion in boiling water for one hour.

In one aspect of the invention, there is provided a blow molded baby bottle formed of a polymeric material, wherein said polymeric material comprises terephthalic acid residues, 2,2,4,4-tetramethyl-1,3-cyclobutanediol residues, and 1,4-cyclohexanedimethanol residues, wherein said polymeric material has a Tg from 100° C. to 130° C., wherein said bottle displays shrinkage of 5% or less after initial immersion in boiling water for one hour.

In one aspect of the invention, there is provided a blow molded bottle (or other blow molded article) formed of a polymeric material, wherein said polymeric material comprises terephthalic acid residues, 2,2,4,4-tetramethyl-1,3-cyclobutanediol residues, and 1,4-cyclohexanedimethanol residues, wherein said polymeric material has a Tg from 100° C. to 130° C., wherein said bottle has a transmission ratio greater than 0.80, wherein said bottle (or other blow molded article) displays shrinkage of 5% or less after initial immersion in boiling water for one hour.

In one aspect of the invention, there is provided a blow molded baby bottle formed of a polymeric material, wherein said polymeric material comprises terephthalic acid residues, 2,2,4,4-tetramethyl-1,3-cyclobutanediol residues, and 1,4-cyclohexanedimethanol residues, wherein said polymeric material has a Tg from 100° C. to 130° C., wherein said bottle has a transmission ratio greater than 0.80, wherein said bottle displays shrinkage of 5% or less after initial immersion in boiling water for one hour.

In one aspect of the invention, there is provided a bottle (or other blow molded article) comprising a polymeric material having a Tg from 100° C. to 130° C., wherein said bottle displays shrinkage of 5% or less after initial immersion in boiling water for one hour, and wherein said polymeric material comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues,
wherein the total mole % of the dicarboxylic acid component is 100 mole %, and the total mole % of the glycol component is 100 mole %;

wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 110° C. to 130° C., wherein said bottle displays shrinkage of 5% or less after initial immersion in boiling water for one hour, and wherein said polymeric material comprises:

(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 10 to 50 mole % of 2,2,4,4-tetramethyl-1,3-cyclobutanediol residues; and
ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 110° C. to 130° C., wherein said bottle displays shrinkage of 5% or less after initial immersion in boiling water for one hour, and wherein said polymeric material comprises:

(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 10 to 50 mole % of 2,2,4,4-tetramethyl-1,3-cyclobutanediol residues; and
ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 100° C. to 130° C., wherein said bottle has a transmission ratio greater than 0.80, wherein said bottle displays shrinkage of 5% or less after initial immersion in boiling water for one hour, and wherein said polymeric material comprises:

(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 10 to 50 mole % of 2,2,4,4-tetramethyl-1,3-cyclobutanediol residues; and
ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 110° C. to 130° C., wherein said bottle has a transmission ratio greater than 0.80, wherein said bottle displays shrinkage of 5% or less after initial immersion in boiling water for one hour, and wherein said polymeric material comprises:

(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 10 to 50 mole % of 2,2,4,4-tetramethyl-1,3-cyclobutanediol residues; and
ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 110° C. to 130° C., wherein said bottle displays shrinkage of 5% or less after initial immersion in boiling water for one hour, and wherein said polymeric material comprises:

(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and
  ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the invention, there is provided a bottle (or other blow molded article) comprising a polymeric material having a Tg from 110° C. to 130° C., wherein said bottle displays shrinkage of 5% or less after initial immersion in boiling water for one hour, and wherein said polymeric material comprises:
(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and
  ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and
  ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and
  ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.0.55 to 0.75 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and
  ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 50 mole % of 2,2,4,4-tetramethyl-1,3-cyclobutanediol residues; and ii) 50 to 90 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.58 to 0.74 dL/g as determined in 60/40 (wt/wt) phenol/tetrachloroethane at a concentration of 0.5 g/100 ml at 25° C.; and wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 115° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.45 to 1.0 dL/g as determined in 60/40 (wt/wt) phenol/tetrachloroethane at a concentration of 0.5 g/100 ml at 25° C.; and wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.45 to 1.0 dL/g as determined in 60/40 (wt/wt) phenol/tetrachloroethane at a concentration of 0.5 g/100 ml at 25° C.; and wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 20 to 45 mole % of 2,2,4,4-tetramethyl-1,3-cyclobutanediol residues; and
ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 20 to 45 mole % of 2,2,4,4-tetramethyl-1,3-cyclobutanediol residues; and
ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.0.55 to 0.75 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 20 to 45 mole % of 2,2,4,4-tetramethyl-1,3-cyclobutanediol residues; and
ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 20 to 45 mole % of 2,2,4,4-tetramethyl-1,3-cyclobutanediol residues; and
ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 20 to 45 mole % of 2,2,4,4-tetramethyl-1,3-cyclobutanediol residues; and
ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 105° C. to 125° C. In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and (b) a glycol component comprising:
  i) 20 to 45 mole % of 2,2,4,4-tetramethyl-1,3-cyclobutanediol residues; and
  ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 20 to 45 mole % of 2,2,4,4-tetramethyl-1,3-cyclobutanediol residues; and
    ii) 55 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 115° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;

wherein the inherent viscosity of the polyester is from 0.45 to 1.0 dL/g as determined in 60/40 (wt/wt) phenol/tetrachloroethane at a concentration of 0.5 g/100 ml at 25° C.; and wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
    (a) a dicarboxylic acid component comprising:
        i) 70 to 100 mole % of terephthalic acid residues;
        ii) 0 to 30 mole % of aromatic dicarboxylic acid residues having up to 20 carbon atoms; and
        iii) 0 to 10 mole % of aliphatic dicarboxylic acid residues having up to 16 carbon atoms; and
    (b) a glycol component comprising:
        i) 30 to 40 mole % of 2,2,4,4-tetramethyl-1,3-cyclobutanediol residues; and
        ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
    (a) a dicarboxylic acid component comprising:
        i) 70 to 100 mole % of terephthalic acid residues;
        ii) 0 to 30 mole % of aromatic dicarboxylic acid residues having up to 20 carbon atoms; and
        iii) 0 to 10 mole % of aliphatic dicarboxylic acid residues having up to 16 carbon atoms; and
    (b) a glycol component comprising:
        i) 30 to 40 mole % of 2,2,4,4-tetramethyl-1,3-cyclobutanediol residues; and
        ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
    (a) a dicarboxylic acid component comprising:
        i) 70 to 100 mole % of terephthalic acid residues;
        ii) 0 to 30 mole % of aromatic dicarboxylic acid residues having up to 20 carbon atoms; and
        iii) 0 to 10 mole % of aliphatic dicarboxylic acid residues having up to 16 carbon atoms; and
    (b) a glycol component comprising:
        i) 30 to 40 mole % of 2,2,4,4-tetramethyl-1,3-cyclobutanediol residues; and
        ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
    (a) a dicarboxylic acid component comprising:
        i) 70 to 100 mole % of terephthalic acid residues;
        ii) 0 to 30 mole % of aromatic dicarboxylic acid residues having up to 20 carbon atoms; and
        iii) 0 to 10 mole % of aliphatic dicarboxylic acid residues having up to 16 carbon atoms; and
    (b) a glycol component comprising:
        i) 30 to 40 mole % of 2,2,4,4-tetramethyl-1,3-cyclobutanediol residues; and
        ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
    (a) a dicarboxylic acid component comprising:
        i) 70 to 100 mole % of terephthalic acid residues;
        ii) 0 to 30 mole % of aromatic dicarboxylic acid residues having up to 20 carbon atoms; and
        iii) 0 to 10 mole % of aliphatic dicarboxylic acid residues having up to 16 carbon atoms; and
    (b) a glycol component comprising:
        i) 30 to 40 mole % of 2,2,4,4-tetramethyl-1,3-cyclobutanediol residues; and
        ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 40 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.0.55 to 0.75 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and (b) a glycol component comprising:
  i) 30 to 40 mole % of 2,2,4,4-tetramethyl-1,3-cyclobutanediol residues; and
  ii) 60 to 70 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.58 to 0.74 dL/g as determined in 60/40 (wt/wt) phenol/tetrachloroethane at a concentration of 0.5 g/100 ml at 25° C.; and wherein the Tg of the polyester composition is from 115° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 115° C. to 125° C.

In one aspect of the invention, there is provided a baby bottle (or other blow molded article) having a shrinkage of 5% or less after immersion in boiling water for one hour, comprising a polyester composition which comprises:

(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues, wherein the total mole % of the dicarboxylic acid component is 100 mole %, and the total mole % of the glycol component is 100 mole %;

wherein the inherent viscosity of the polyester is from 0.45 to 1.0 dL/g as determined in 60/40 (wt/wt) phenol/tetrachloroethane at a concentration of 0.5 g/100 ml at 25° C.; and wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.45 to 1.0 dL/g as determined in 60/40 (wt/wt) phenol/tetrachloroethane at a concentration of 0.5 g/100 ml at 25° C.; and
  wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.45 to 1.0 dL/g as determined in 60/40 (wt/wt) phenol/tetrachloroethane at a concentration of 0.5 g/100 ml at 25° C.; and
  wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.55 to 0.80 dL/g as determined in 60/40 (wt/wt) phenol/tetrachloroethane at a concentration of 0.5 g/100 ml at 25° C.; and
  wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.55 to 0.80 dL/g as determined in 60/40 (wt/wt) phenol/tetrachloroethane at a concentration of 0.5 g/100 ml at 25° C.; and
  wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 33 to 37 mole % of 2,2,4,4-tetramethyl-1,3-cyclobutanediol residues; and
    ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.55 to 0.80 dL/g as determined in 60/40 (wt/wt) phenol/tetrachloroethane at a concentration of 0.5 g/100 ml at 25° C.; and
  wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.75 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.0.55 to 0.75 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and (b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.; and
wherein the Tg of the polyester composition is from 115° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 100° C. to 140° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 100° C. to 130° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.; and
wherein the Tg of the polyester composition is from 105° C. to 125° C.

In one aspect of the invention, there is provided a baby bottle (or other blow molded article) having a shrinkage of 5% or less after immersion in boiling water for one hour, comprising a polyester composition which comprises:
(I) at least one polyester, which further comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;

wherein the inherent viscosity of the polyester is from 0.60 to 0.68 dL/g as determined in 60/40 (wt/wt) phenol/tetrachloroethane at a concentration of 0.5 g/100 ml at 25° C.; and wherein the Tg of the polyester composition is from 115° C. to 125° C.

In one embodiment, bottles, baby bottles, or other blow molded articles are produced with a stretch ratio of less than or equal to 3. In another embodiments, the stretch ratio is less than or equal to 2.5 or less than or equal to 2.0. In yet another embodiment, the stretch ratio is in the range from 1.2 to 2.0. In one embodiment, the preform temperature at the time of inflation is Tg+20° C. or higher. In another embodiment, the preform temperature at the time of inflation is Tg+30° C. or higher. In another embodiment, the stretch ratio is less than 2 and the preform temperature is Tg+30° C. or higher. In another embodiment, the stretch ratio is less than 1.6 and the preform temperature is Tg+20° C. or higher. By comparison, typical prior art plastic soft-drink containers have stretch ratios of greater than 3 and their preforms are typically at a temperature of Tg+20° C. at the time of blowing.

In another embodiment, bottles, baby bottles, or other blow molded articles are produced with a stretch ratio less than a calculated stretch ratio (CSR) determined by the following equation: CSR=(0.022)(PT)+(0.074)(Tg)−10, Where PT is the preform temperature at the time of inflation and Tg is the glass transition temperature of the polymeric material from which the preform is made. In other embodiments, the stretch ratio of the blow molded article or bottle with respect to the preform is 20 to 99%, 30 to 95%, or 40 to 90% of the calculated stretch ratio (CSR).

In another embodiment, the preform temperature at the time of inflation is greater than a calculated preform temperature (CPT) determined by the following equation: CPT=(45.44)(SR)−(3.36)(Tg)+454, wherein SR is the stretch ratio of the bottle relative to the preform and Tg is the glass transition temperature of the polymeric material being blow molded. In one embodiment, the preform temperature at the time of inflation is greater than the calculated preform temperature (CPT) by one or more of the following amounts: 1 to 80° C., 10 to 70° C., and/or 20 to 60° C.

In one aspect of the invention, there is provided a process for making a baby bottle (or other blow molded article) comprising blow molding a preform made from a polymeric material, wherein the preform temperature at the time of inflation is at least 20° C. above the Tg temperature of the polymeric material; wherein the stretch ratio of the baby bottle with respect to the preform is 2.7 or less; wherein the Tg of the polymeric material is from 100° C. to 130° C.; and wherein the baby bottle displays shrinkage of 5% or less after immersion in boiling water for one hour.

In one aspect of the invention, there is provided a process for making a baby bottle (or other blow molded article) comprising blow molding a preform made from a polymeric material, wherein the preform temperature at the time of inflation is at least 20° C. above the Tg temperature of the polymeric material; wherein the stretch ratio of the baby bottle (or other blow molded article) with respect to the preform is 2.7 or less; wherein the Tg of the polymeric material is from 100° C. to 130° C.; wherein the baby bottle (or other blow molded article) displays shrinkage of 5% or less after immersion in boiling water for one hour; and wherein the polymeric material comprises at least one polyester, which comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 10 to 50 mole % of 2,2,4,4-tetramethyl-1,3-cyclobutanediol residues; and
ii) 50 to 90 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the invention, in the baby bottles, other blow molded articles and/or process(es) of the invention, the polymeric material can be chosen from at least one of polyacrylics, polystyrenes, polyesters; blends thereof, and polycarbonate/polyester blends.

In one aspect of the invention, in the baby bottles, other blow molded articles, and/or process(es) of the invention, the polymeric material is chosen from at least one polyester. In another aspect, the polymeric material comprises a polyester in an amount of at least 90, 95, 99, or 99.5 weight percent based on the total weight of the polymeric material.

In one aspect of the baby bottles, other blow molded articles, and/or the processes of the invention, the glycol component of the polyester composition can comprise: 10 to 50 mole % of 2,2,4,4-tetramethyl-1,3-cyclobutanediol residues; and 50 to 90 mole % of 1,4-cyclohexanedimethanol residues; 20 to 45 mole % of 2,2,4,4-tetramethyl-1,3-cyclobutanediol residues; and 65 to 80 mole % of 1,4-cyclohexanedimethanol residues; 30 to 40 mole % of 2,2,4,4-tetramethyl-1,3-cyclobutanediol residues; and 60 to 70 mole % of 1,4-cyclohexanedimethanol residues; or 33 to 37 mole % of 2,2,4,4-tetramethyl-1,3-cyclobutanediol residues; and 63 to 67 mole % of 1,4-cyclohexanedimethanol residues.

In one aspect of the baby bottles, other blow molded articles, and/or processes of the invention, the polyester can have a Tg of from 100 to 130° C.; or from 110 to 130° C.; or from 100 to 125° C.; or from 105 to 125° C.; or from 115 to 125° C.; or from 118 to 122° C.

In one aspect of the baby bottles, other blow molded articles, and/or processes of the invention, the preform temperature at the time of inflation can be at least 30° C. above the Tg temperature of the polymeric material and/or polyester.

In one aspect of the processes of the invention, the preform temperature at the time of inflation can be from 30° C. above the Tg temperature of the polymeric material and/or polyester to 70° C. above the Tg temperature of the polymeric material and/or polyester. In one aspect of the processes of the invention, the preform temperature at the time of inflation can be from 30° C. above the Tg temperature of the polymeric material and/or polyester to 60° C. above the Tg temperature of the polymeric material and/or polyester.

In one aspect of the processes of the invention, the stretch ratio of the baby bottle with respect to the preform is from 1.2 to 2.7 or from 1.2 to 2.5 or from 1.2 to 2.0 or from 1.3 to 1.7.

In one aspect of the baby bottles, other blow molded articles, and/or the processes of the invention, the baby bottle (or other blow molded article) can have shrinkage of 5% or less after immersion in boiling water for one hour; or can have a shrinkage of 4% or less after immersion in boiling water for one hour; or can have a shrinkage of 3% or less after immersion in boiling water for one hour; or can have a shrinkage of 2% or less after immersion in boiling water for one hour; or can have a shrinkage of 1% or less after immersion in boiling water for one hour. The shrinkage percentages referred to herein of the blow molded articles or bottles are understood to mean that the shrinkage percentage is being measured after the blow molded article or bottle is immersed for the first time in boiling water for one hour.

In one aspect of the baby bottles, other blow molded articles, and/or the processes of the invention, the side wall of the baby bottle (or other blow molded article) can have: a haze of 3% or less after immersion in boiling water for one hour; or a haze of 2% or less after immersion in boiling water for one hour; or a haze of 1% or less after immersion in boiling water for one hour. In one aspect of the baby bottles, other blow molded articles, and/or the processes of the invention, at least one side wall of the baby bottle (or other blow molded article) can have: a birefringence of 0.02 or less; or a birefringence of 0.015 or less; or a birefringence of 0.01 or less.

In one aspect of the baby bottles, other blow molded articles, and/or the processes of the invention, the stretch ratio of the baby bottle (or other blow molded article) with respect to the preform is from 1.2 to 2.5; wherein the Tg of the polyester composition is from 105° C. to 125° C.; wherein the baby bottle (or other blow molded article) displays shrinkage of 5% or less after immersion in boiling water for one hour; and the inherent viscosity of the polyester is from 0.55 to 0.80 dL/g as determined in 60/40 (wt/wt) phenol/tetrachloroethane at a concentration of 0.5 g/100 ml at 25° C.

In one aspect of the baby bottles, other blow molded articles, and/or the processes of the invention, the preform temperature at the time of inflation of the baby bottle (or other blow molded article) can be at least 30° C. above the Tg temperature of the polyester composition.

In one aspect of the baby bottles, other blow molded articles, and/or the processes of the invention, the preform temperature at the time of inflation of the baby bottle (or other blow molded article) is at least 30° C. above the Tg temperature of the polyester composition; wherein the stretch ratio of the baby bottle with respect to the preform is from 1.4 to 2.0; wherein the Tg of the polyester composition is from 105° C. to 125° C.; and wherein the baby bottle displays shrinkage of 5% or less after immersion in boiling water for one hour.

In one aspect of the baby bottles, other blow molded articles, and/or the processes of the invention, the preform temperature at the time of inflation of the baby bottle (or other blow molded article) is at least 30° C. above the Tg temperature of the polyester composition; wherein the stretch ratio of the baby bottle (or other blow molded article blow molded article) with respect to the preform is from 1.2 to 2.0; wherein the Tg of the polyester composition is from 105° C. to 125° C.;

wherein the baby bottle (or other blow molded article blow molded article) displays shrinkage of 5% or less after immersion in boiling water for one hour;

wherein the polyester composition comprises:

(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
  wherein the total mole % of the dicarboxylic acid component is 100 mole %, and the total mole % of the glycol component is 100 mole %;

wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the invention, baby bottles, other blow molded articles, and/or processes of the invention, the inherent viscosity of the polyester useful in the invention can be from 0.58 to 0.74 dL/g or 0.55 to 0.80 dL/g or 0.55 to 0.75 dL/g as d baby bottles, other blow molded articles, and/or processes of the invention, determined in 60/40 (wt/wt) phenol/tetrachloroethane at a concentration of 0.5 g/100 ml at 25° C.

In one aspect of the baby bottles, other blow molded articles, and/or processes of the invention, the glycol component of the polyester useful in the invention can comprise 20 to 45 mole % of 2,2,4,4-tetramethyl-1,3-cyclobutanediol residues; and 65 to 80 mole % of 1,4-cyclohexanedimethanol residues;

wherein the inherent viscosity of the polyester can be from 0.55 to 0.80 dL/g as determined in 60/40 (wt/wt) phenol/tetrachloroethane at a concentration of 0.5 g/100 ml at 25° C.; and the polyester can have a Tg of from 105 to 125° C.

In one aspect of the baby bottles, other blow molded articles, and/or processes of the invention, the glycol component of the polyester useful in the invention can comprise 30 to 40 mole % of 2,2,4,4-tetramethyl-1,3-cyclobutanediol residues; and 60 to 70 mole % of 1,4-cyclohexanedimethanol residues; and the inherent viscosity of the polyester can be from 0.58 to 0.74 dL/g as determined in 60/40 (wt/wt) phenol/tetrachloroethane at a concentration of 0.5 g/100 ml at 25° C.; and the polyester can have a Tg of from 115 to 125° C.

In one aspect of the baby bottles, other blow molded articles, and/or processes of the invention, the glycol component of the polyester useful in the invention can comprise a polyester comprising 33 to 37 mole % of 2,2,4,4-tetramethyl-1,3-cyclobutanediol residues; and 63 to 67 mole % of 1,4-cyclohexanedimethanol residues; the inherent viscosity of the polyester can be from 0.60 to 0.68 dL/g as determined in 60/40 (wt/wt) phenol/tetrachloroethane at a concentration of 0.5 g/100 ml at 25° C.; and the polyester can have a Tg of from 118 to 122° C.

In one aspect of the processes of the invention, the process for making a baby bottle (or other blow molded article) can comprise blow molding a preform made from a polyester composition, wherein the preform temperature at the time of inflation is at least 20° C. above the Tg temperature of the polyester composition;

wherein the stretch ratio of the baby bottle (or other blow molded article) with respect to the preform is from 2.7 or less; wherein the Tg of the polyester composition is from 100° C. to 130° C.; and wherein the baby bottle (or other blow molded article) displays shrinkage of 5% or less after immersion in boiling water for one hour.

In one aspect of the processes of the invention, the process for making a baby bottle (or other blow molded article) can comprise blow molding a preform made from a polyester composition, wherein the preform temperature at the time of inflation is at least 20° C. above the Tg temperature of the polyester composition;

wherein the stretch ratio of the baby bottle (or other blow molded article) with respect to the preform is from 2.7 or less; wherein the Tg of the polyester composition is from 100° C. to 130° C.; wherein the baby bottle (or other blow molded article) displays shrinkage of 5% or less after immersion in boiling water for one hour; wherein the polyester composition comprises:

(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 20° C. above the Tg temperature of the polyester composition; wherein the stretch ratio of the baby bottle (or other blow molded article) with respect to the preform is from 1.2 to 2.5; wherein the Tg of the polyester composition is from 105° C. to 125° C.; wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 20 to 45 mole % of 2,2,4,4-tetramethyl-1,3-cyclobutanediol residues; and
      ii) 65 to 80 mole % of 1,4-cyclohexanedimethanol residues,
    wherein the total mole % of the dicarboxylic acid component is 100 mole %, and the total mole % of the glycol component is 100 mole %;
    wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other blow molded article) with respect to the preform is from 1.2 to 2.5; wherein the Tg of the polyester composition is from 105° C. to 125° C.; wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 20 to 45 mole % of 2,2,4,4-tetramethyl-1,3-cyclobutanediol residues; and
      ii) 65 to 80 mole % of 1,4-cyclohexanedimethanol residues,
    wherein the total mole % of the dicarboxylic acid component is 100 mole %, and the total mole % of the glycol component is 100 mole %;
    wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is from 30° C. above the Tg temperature of the polyester composition to 70° C. above the Tg temperature of the polyester composition; wherein the stretch ratio of the baby bottle (or other blow molded article) with respect to the preform is from 1.2 to 2.5; wherein the Tg of the polyester composition is from 105° C. to 125° C.;
  wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 20 to 45 mole % of 2,2,4,4-tetramethyl-1,3-cyclobutanediol residues; and
      ii) 65 to 80 mole % of 1,4-cyclohexanedimethanol residues,
    wherein the total mole % of the dicarboxylic acid component is 100 mole %, and the total mole % of the glycol component is 100 mole %;
    wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other article of manufacture) with respect to the preform is from 1.4 to 2.0; wherein the Tg of the polyester composition is from 105° C. to 125° C.; wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and (b) a glycol component comprising:
i) 20 to 45 mole % of 2,2,4,4-tetramethyl-1,3-cyclobutanediol residues; and
ii) 65 to 80 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (or other blow molded article) with respect to the preform is from 1.2 to 2.0; wherein the Tg of the polyester composition is from 105° C. to 125° C.; wherein the baby bottle (or other blow molded article) displays shrinkage of 5% or less after immersion in boiling water for one hour; wherein the polyester composition comprises:
(I) at least one polyester, which comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (blow molded article) with respect to the preform is from 1.2 to 2.0; wherein the Tg of the polyester composition is from 105° C. to 125° C.; wherein the baby bottle (blow molded article) displays shrinkage of 5% or less after immersion in boiling water for one hour; wherein the polyester composition comprises:
(I) at least one polyester, which comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 33 to 37 mole % of 2,2,4,4-tetramethyl-1,3-cyclobutanediol residues; and
ii) 63 to 67 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (or other blow molded article) with respect to the preform is from 1.2 to 2.0; wherein the Tg of the polyester composition is from 115° C. to 125° C.; wherein the baby bottle (or other blow molded article) displays shrinkage of 5% or less after immersion in boiling water for one hour; wherein the polyester composition comprises:
(I) at least one polyester, which comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (or other article of manufacture) with respect to the preform is from 1.2 to 2.0; wherein the Tg of the polyester composition is from 115° C. to 125° C.; wherein the baby bottle (or other article of manufacture) displays shrinkage of 5% or less after immersion in boiling water for one hour; wherein the polyester composition comprises:
(I) at least one polyester, which comprises
(a) a dicarboxylic acid component comprising:
i) 70 to 100 mole % of terephthalic acid residues;
ii) 0 to 30 mole % of aromatic dicarboxylic acid residues having up to 20 carbon atoms; and
iii) 0 to 10 mole % of aliphatic dicarboxylic acid residues having up to 16 carbon atoms; and
(b) a glycol component comprising:
i) 30 to 40 mole % of 2,2,4,4-tetramethyl-1,3-cyclobutanediol residues; and
ii) 60 to 70 mole % of 1,4-cyclohexanedimethanol residues, wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (blow molded article) with respect to the preform is from 1.2 to 2.0; wherein the Tg of the polyester composition is from 115° C. to 125° C.; wherein the baby bottle (blow molded article) displays shrinkage of 5% or less after immersion in boiling water for one hour; wherein the polyester composition comprises:
(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (blow molded article) with respect to the preform is from 1.2 to 2.0; wherein the Tg of the polyester composition is from 115° C. to 125° C.; wherein the baby bottle (blow molded article) displays shrinkage of 5% or less after immersion in boiling water for one hour; wherein the polyester composition comprises:
(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (or other blow molded article) with respect to the preform is from 1.2 to 2.0; wherein the Tg of the polyester composition is from 115° C. to 125° C.; wherein the baby bottle (or other blow molded article) displays shrinkage of 5% or less after immersion in boiling water for one hour; wherein the polyester composition comprises:
(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.58 to 0.74 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
wherein the stretch ratio of the baby bottle (or other blow molded article) with respect to the preform is from 1.2 to 2.0; wherein the Tg of the polyester composition is from 115° C. to 125° C.; wherein the baby bottle (or other blow molded article) displays shrinkage of 5% or less after immersion in boiling water for one hour; wherein the polyester composition comprises:
(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.60 to 0.68 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other blow molded article) with respect to the preform is from 1.2 to 2.0; wherein the Tg of the polyester composition is from 118° C. to 122° C.; wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 33 to 37 mole % of 2,2,4,4-tetramethyl-1,3-cyclobutanediol residues; and
      ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.60 to 0.68 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other blow molded article) with respect to the preform is from 1.3 to 1.7; wherein the Tg of the polyester composition is from 118° C. to 122° C.; wherein the baby bottle (or other blow molded article) displays shrinkage of 5% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 33 to 37 mole % of 2,2,4,4-tetramethyl-1,3-cyclobutanediol residues; and
      ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.60 to 0.68 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other blow molded article) with respect to the preform is from 1.3 to 1.7; wherein the Tg of the polyester composition is from 118° C. to 122° C.; wherein the baby bottle (or other blow molded article) displays shrinkage of 3% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 33 to 37 mole % of 2,2,4,4-tetramethyl-1,3-cyclobutanediol residues; and
      ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.60 to 0.68 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;
  wherein the stretch ratio of the baby bottle (or other blow molded article) with respect to the preform is from 1.3 to 1.7; wherein the Tg of the polyester composition is from 118° C. to 122° C.; wherein the baby bottle (or other blow molded article) displays shrinkage of 3% or less after immersion in boiling water for one hour; wherein the polyester composition comprises:
  (I) at least one polyester, which comprises
    (a) a dicarboxylic acid component comprising:
      i) 70 to 100 mole % of terephthalic acid residues;
      ii) 0 to 30 mole % of aromatic dicarboxylic acid residues having up to 20 carbon atoms; and
      iii) 0 to 10 mole % of aliphatic dicarboxylic acid residues having up to 16 carbon atoms; and
    (b) a glycol component comprising:
      i) 33 to 37 mole % of 2,2,4,4-tetramethyl-1,3-cyclobutanediol residues; and
      ii) 63 to 67 mole % of 1,4-cyclohexanedimethanol residues,
  wherein the total mole % of the dicarboxylic acid component is 100 mole %, and the total mole % of the glycol component is 100 mole %;
  wherein the inherent viscosity of the polyester is from 0.64 to 0.65 dL/g as determined in 60/40 (wt/wt) phenol/tetrachloroethane at a concentration of 0.5 g/100 ml at 25° C.

In one aspect of the processes of the invention, the process for making a baby bottle (or other blow molded article) can comprise blow molding a preform made from a polyester composition, wherein the preform temperature at the time of inflation is at least 30° C. above the Tg temperature of the polyester composition;

wherein the stretch ratio of the baby bottle (or other blow molded article) with respect to the preform is from 1.3 to 1.7; wherein the Tg of the polyester composition is from 118° C. to 122° C.; wherein the baby bottle (or other blow molded article) displays shrinkage of 3% or less after immersion in boiling water for one hour; wherein the polyester composition comprises:

(I) at least one polyester, which comprises
 (a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
 (b) a glycol component comprising:
  i) 35 mole % of 2,2,4,4-tetramethyl-1,3-cyclobutanediol residues; and
  ii) 65 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.64 to 0.65 dL/g as determined in 60/40 (wt/wt) phenol/tetrachloroethane at a concentration of 0.5 g/100 ml at 25° C.

In one aspect of the invention, there is provided a blow molding process comprising: blow molding a preform into a bottle, wherein the stretch ratio (SR) of said bottle with respect to said preform is 3.0 or less, wherein said preform is formed of a polymeric material having a glass transition temperature (Tg) from 100 to 130° C., wherein the preform temperature at the time of inflation is greater than a calculated preform temperature (CPT) determined by the following equation: $CPT=(45.44)(SR)-(3.36)(Tg)+454$.

In one aspect of the invention, the Tg of the polymeric material is from 110 to 130° C.

In one aspect of the invention, there is provided a blow molding process(es) wherein the preform temperature at the time of inflation is 1 to 80° C. greater than said calculated preform temperature.

In one aspect of the invention, there is provided a blow molding process(es) wherein the preform temperature at the time of inflation is 10 to 70° C. greater than said calculated preform temperature.

In one aspect of the invention, there is provided a blow molding process(es) wherein the preform temperature at the time of inflation is 20 to 60° C. greater than said calculated preform temperature.

In one aspect of the invention, there is provided a blow molding process(es), wherein the stretch ratio of said bottle with respect to said preform is from 1.2 to 2.5.

In one aspect of the invention, there is provided a blow molding process(es), wherein the stretch ratio of said bottle with respect to said preform is from 1.2 to 2.0.

In one aspect of the invention, there is provided a blow molding process(es), wherein the stretch ratio of said bottle with respect to said preform is from 1.3 to 1.7.

In one aspect of the invention, there is provided a blow molding process(es) wherein the bottle displays shrinkage of 5% or less after immersion in boiling water for one hour.

In one aspect of the invention, there is provided a blow molding process(es) wherein the bottle displays shrinkage of 4% or less after immersion in boiling water for one hour.

In one aspect of the invention, there is provided a blow molding process(es) wherein the bottle displays shrinkage of 3% or less after immersion in boiling water for one hour.

In one aspect of the invention, there is provided a blow molding process(es) wherein the bottle displays shrinkage of 2% or less after immersion in boiling water for one hour.

In one aspect of the invention, there is provided a blow molding process(es) wherein the bottle displays shrinkage of 1% or less after immersion in boiling water for one hour.

In one aspect of the invention, there is provided a blow molding process(es) wherein the polymeric material has a Tg from 105 to 125° C.

In one aspect of the invention, there is provided a blow molding process(es) wherein the polymeric material has a Tg from 110 to 125° C.

In one aspect of the invention, there is provided a blow molding process(es) wherein the polymeric material has a Tg from 115 to 125° C.

In one aspect of the invention, there is provided a blow molding process(es) wherein the bottle has a transmission ratio of 0.80 or greater.

In one aspect of the invention, there is provided a blow molding process(es) wherein the bottle has a transmission ratio of 0.90 or greater.

In one aspect of the invention, there is provided a blow molding process(es) wherein the bottle has a transmission ratio of 0.95 or greater.

In one aspect of the invention, there is provided a blow molding process(es) wherein the bottle has a birefringence of 0.02 or less.

In one aspect of the invention, there is provided a blow molding process(es) wherein the bottle has a birefringence of 0.015 or less.

In one aspect of the invention, there is provided a blow molding process(es) wherein the bottle has a birefringence of 0.01 or less.

In one aspect of the invention, there is provided a blow molding process(es) wherein the polymeric material has an inherent viscosity from 0.55 to 0.80 dL/g as determined in 60/40 (wt/wt) phenol/tetrachloroethane at a concentration of 0.5 g/100 ml at 25° C.

In one aspect of the invention, there is provided a blow molding process(es) wherein the polymeric material has an inherent viscosity from 0.60 to 0.68 dL/g as determined in 60/40 (wt/wt) phenol/tetrachloroethane at a concentration of 0.5 g/100 ml at 25° C.

In one aspect of the invention, there is provided a blow molding process(es) wherein the stretch ratio of said bottle with respect to the preform is 2.0 or less, wherein the bottle displays shrinkage of 3% or less after immersion in boiling water for one hour, wherein the polymeric material has a Tg from 105 to 125° C., wherein the bottle has a transmission ratio of 0.90 or greater, wherein the bottle has a birefringence of 0.015 or less, wherein the polymeric material has an inherent viscosity from 0.55 to 0.80 dL/g as determined in 60/40 (wt/wt) phenol/tetrachloroethane at a concentration of 0.5 g/100 ml at 25° C.

In one aspect of the invention, there is provided a blow molding process(es) wherein the polymeric material is selected from the group consisting of polyacrylics, polystyrenes, polyesters; blends thereof, and polycarbonate/polyester blends.

In one aspect of the invention, there is provided a blow molding process(es) wherein the polymeric material comprises a polyester in an amount of at least 95 weight percent based on the total weight of said polymeric material.

In one aspect of the invention, there is provided a blow molding process(es) wherein the polymeric material comprises a polyester in an amount of at least 99.5 weight percent based on the total weight of said polymeric material.

In one aspect of the invention, there is provided a blow molding process(es) wherein the polymeric material comprises terephthalic acid residues, 2,2,4,4-tetramethyl-1,3-cyclobutanediol residues, and 1,4-cyclohexanedimethanol residues, In one aspect of the invention, there is provided a blow molding process(es) wherein the polymeric material comprises at least one polyester, which comprises
(a) a dicarboxylic acid component comprising:
 i) 70 to 100 mole % of terephthalic acid residues;
 ii) 0 to 30 mole % of aromatic dicarboxylic acid residues having up to 20 carbon atoms; and
 iii) 0 to 10 mole % of aliphatic dicarboxylic acid residues having up to 16 carbon atoms; and
(b) a glycol component comprising:
 i) 10 to 50 mole % of 2,2,4,4-tetramethyl-1,3-cyclobutanediol residues; and
 ii) 50 to 90 mole % of 1,4-cyclohexanedimethanol residues,
wherein the total mole % of said dicarboxylic acid component is 100 mole %, and the total mole % of said glycol component is 100 mole %.

In one aspect of the invention, there is provided a blow molding process(es) wherein the glycol component of the polyester comprises 20 to 45 mole % of 2,2,4,4-tetramethyl-1,3-cyclobutanediol residues and 65 to 80 mole % of 1,4-cyclohexanedimethanol residues, wherein the polyester has an inherent viscosity from 0.55 to 0.80 dL/g as determined in 60/40 (wt/wt) phenol/tetrachloroethane at a concentration of 0.5 g/100 ml at 25° C., wherein the polyester has a Tg from 105 to 125° C.

In one aspect of the invention, there is provided a blow molding process(es) wherein the glycol component of said polyester comprises 30 to 40 mole % of 2,2,4,4-tetramethyl-1,3-cyclobutanediol residues and 60 to 70 mole % of 1,4-cyclohexanedimethanol residues, wherein the polyester has an inherent viscosity from 0.58 to 0.74 dL/g as determined in 60/40 (wt/wt) phenol/tetrachloroethane at a concentration of 0.5 g/100 ml at 25° C., wherein the polyester has a Tg from 115 to 125° C.

In one aspect of the invention, there is provided a blow molding process(es) wherein the stretch ratio of the bottle with respect to the preform is 2.0 or less, wherein the bottle displays shrinkage of 3% or less after immersion in boiling water for one hour, wherein the bottle has a transmission ratio of 0.90 or greater, wherein said bottle has a birefringence of 0.015 or less.

In one aspect of the invention, there is provided a blow molding process(es) wherein the bottle is a baby bottle 65. In one aspect of the invention, there is provided a blow molding process(es) comprising: blow molding a preform into a bottle, wherein the preform is formed of a polymeric material having a glass transition temperature (Tg) from 100 to 130° C., wherein the preform temperature at the time of inflation is at least 20° C. above the Tg of the polymeric material, wherein the stretch ratio of the bottle with respect to the preform is less than a calculated stretch ratio (CSR) determined by the following equation: CSR=(0.022)(PT)+(0.074)(Tg)−10.

In one aspect of the invention, there is provided a blow molding process(es) wherein the stretch ratio of the bottle with respect to the preform is 20 to 99% of the calculated stretch ratio.

In one aspect of the invention, there is provided a blow molding process(es) wherein the stretch ratio of said bottle with respect to the preform is 30 to 95% of said calculated stretch ratio.

In one aspect of the invention, there is provided a blow molding process(es) wherein the stretch ratio of said bottle with respect to the preform is 40 to 90% of said calculated stretch ratio.

In one aspect of the invention, there is provided a blow molding process(es) wherein the preform temperature at the time of inflation is at least 30° C. above the Tg of the polymeric material.

In one aspect of the invention, there is provided a blow molding process(es) wherein the preform temperature at the time of inflation is from 30° C. above the Tg of the polymeric material to 70° C. above the Tg of the polymeric material.

In one aspect of the invention, there is provided a blow molding process(es) wherein the bottle displays shrinkage of 5% or less after immersion in boiling water for one hour.

In one aspect of the invention, there is provided a blow molding process(es) wherein the bottle displays shrinkage of 3% or less after immersion in boiling water for one hour.

In one aspect of the invention, there is provided a blow molding process(es) wherein the polymeric material has a Tg from 105 to 125° C.

In one aspect of the invention, there is provided a blow molding process(es) wherein the bottle has a transmission ratio of 0.90 or greater.

In one aspect of the invention, there is provided a blow molding process(es) wherein the bottle has a transmission ratio of 0.95 or greater.

In one aspect of the invention, there is provided a blow molding process(es) wherein said bottle has a birefringence of 0.02 or less.

In one aspect of the invention, there is provided a blow molding process(es) wherein the bottle has a birefringence of 0.015 or less.

In one aspect of the invention, there is provided a blow molding process(es) wherein the polymeric material has an inherent viscosity from 0.55 to 0.80 dL/g as determined in 60/40 (wt/wt) phenol/tetrachloroethane at a concentration of 0.5 g/100 ml at 25° C.

In one aspect of the invention, there is provided a blow molding process(es) wherein the polymeric material comprises terephthalic acid residues, 2,2,4,4-tetramethyl-1,3-cyclobutanediol residues, and 1,4-cyclohexanedimethanol residues, In one aspect of the invention, there is provided a blow molding process(es) wherein the polymeric material comprises at least one polyester, which comprises
(a) a dicarboxylic acid component comprising:
 i) 70 to 100 mole % of terephthalic acid residues;
 ii) 0 to 30 mole % of aromatic dicarboxylic acid residues having up to 20 carbon atoms; and
 iii) 0 to 10 mole % of aliphatic dicarboxylic acid residues having up to 16 carbon atoms; and
(b) a glycol component comprising:
 i) 10 to 50 mole % of 2,2,4,4-tetramethyl-1,3-cyclobutanediol residues; and
 ii) 50 to 90 mole % of 1,4-cyclohexanedimethanol residues,
wherein the total mole % of the dicarboxylic acid component is 100 mole %, and the total mole % of the glycol component is 100 mole %.

In one aspect of the invention, there is provided a blow molding process(es) wherein the glycol component of said polyester comprises 30 to 40 mole % of 2,2,4,4-tetramethyl-1,3-cyclobutanediol residues and 60 to 70 mole % of 1,4-cyclohexanedimethanol residues.

In one aspect of the invention, there is provided a blow molding process(es) wherein the bottle is a baby bottle.

In one aspect of the invention, there is provided a blow molded bottle formed of a polymeric material, wherein said polymeric material comprises terephthalic acid residues, 2,2,4,4-tetramethyl-1,3-cyclobutanediol residues, and 1,4-cyclohexanedimethanol residues, wherein said polymeric material has a Tg from 100 to 130° C., wherein said bottle has a transmission ratio greater than 0.80, wherein said bottle displays shrinkage of 5% or less after immersion in boiling water for one hour.

In one aspect of the invention, there is provided a blow molded bottle wherein said polymeric material has a Tg from 110 to 130° C.

In one aspect of the invention, there is provided a blow molded bottle wherein said polymeric material has a Tg from 105 to 125° C.

In one aspect of the invention, there is provided a blow molded bottle wherein said bottle displays shrinkage of 3% or less after immersion in boiling water for one hour.

In one aspect of the invention, there is provided a blow molded bottle wherein said bottle has a transmission ratio of 0.90 or greater.

In one aspect of the invention, there is provided a blow molded bottle wherein said bottle has a transmission ratio of 0.95 or greater.

In one aspect of the invention, there is provided a blow molded bottle wherein said bottle has a birefringence of 0.02 or less.

In one aspect of the invention, there is provided a blow molded bottle wherein said bottle has a birefringence of 0.015 or less.

In one aspect of the invention, there is provided a blow molded bottle wherein said polymeric material has an inherent viscosity from 0.55 to 0.80 dL/g as determined in 60/40 (wt/wt) phenol/tetrachloroethane at a concentration of 0.5 g/100 ml at 25° C.

In one aspect of the invention, there is provided a blow molded bottle wherein said polymeric material comprises a polyester in an amount of at least 95 weight percent based on the total weight of said polymeric material.

In one aspect of the invention, there is provided a blow molded bottle wherein said polymeric material comprises a polyester in an amount of at least 99.5 weight percent based on the total weight of said polymeric material.

In one aspect of the invention, there is provided a blow molded bottle wherein said polymeric material comprises at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 10 to 50 mole % of 2,2,4,4-tetramethyl-1,3-cyclobutanediol residues; and
    ii) 50 to 90 mole % of 1,4-cyclohexanedimethanol residues,
  wherein the total mole % of said dicarboxylic acid component is 100 mole %, and the total mole % of said glycol component is 100 mole %.

In one aspect of the invention, there is provided a blow molded bottle wherein said glycol component of said polyester comprises 30 to 40 mole % of 2,2,4,4-tetramethyl-1,3-cyclobutanediol residues and 60 to 70 mole % of 1,4-cyclohexanedimethanol residues.

In one aspect of the invention, there is provided a blow molded bottle wherein said blow molded bottle is a baby bottle.

Any of the processes of the invention can be used to make at least one of the blow molded articles of the invention, including but not limited to baby bottles, bottles, containers, and/or food stuff containers.

The invention also relates to blow molded articles, including but not limited to baby bottles, which are made by at least one of the processes of the invention.

In addition, this invention also relates to blow molded articles, including but not limited to baby bottles, which can be made by at least one of the processes of the invention.

In one aspect of the invention, the side wall of a baby bottle (or other molded article) can have at least one transmission ratio selected from: 0.80 or greater; 0.85 or greater; 0.90 or greater; 0.95 or greater; and 1.0 or greater.

In one aspect of the invention, the polyesters useful in the processes of the invention can comprise a phosphate ester.

In one aspect of the invention, the polyesters useful in the processes of the invention can comprise an aryl phosphate ester.

In one aspect of the invention, the polyesters useful in the processes of the invention can comprise a triaryl phosphate ester.

In one aspect of the invention, the polyesters useful in the processes of the invention can comprise a triphenyl phosphate ester.

In one aspect of the invention, the polyesters useful in the processes of the invention can comprise triphenyl phosphate.

In one aspect of the invention, blow molded articles are provided wherein the processes of the invention result in a container.

In one aspect of the invention, blow molded articles are provided wherein the processes of the invention result in a bottle.

In one aspect of the invention, blow molded articles are provided wherein the processes of the invention result in a baby bottle.

In one aspect of the invention, blow molded articles are provided wherein the processes of the invention result in a foodstuff container.

The blow molded articles of the invention can be substantially bisphenol A.

The articles of manufacture of the invention can also be bisphenol A free.

The processes of this invention and/or the products resulting therefrom have advantages which include but are not limited to: favorable consumer perception because of the lack of BPA in the final product; good chemical resistance, and good hydrolytic stability.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

The present disclosure may be understood more readily by reference to the following detailed description of certain embodiments of the invention and the working examples.

In accordance with the purposes of this invention, certain embodiments of the invention are described in the Summary of the Invention and are further described herein below. Also, other embodiments of the invention are described herein.

DEFINITIONS

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example, 1, 2, 3, 4, etc., as well as the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms "a," "an," and "the" include their plural referents unless the context clearly dictates otherwise. For example, reference to the processing or making of a "bottle" or a "polyester," is intended to include the processing or making of a plurality of bottles, or polyesters. References to a composition containing or including "an" alkyl radical or "a" blend is intended to include other ingredients or other components, respectively, in addition to the one named.

By "comprising" or "containing" or "including," this disclosure intends that at least the named compound, element, particle, or method step, etc., is present in the composition or article or method, but does not exclude the presence of other compounds, catalysts, materials, particles, method steps, etc., even if the other such compounds, materials, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and it is to be understood that the recited lettering can be arranged in any sequence, unless otherwise indicated.

For purposes of this application, "shrinkage" or "percent shrink" or "percent shrinkage" is a measure of a blow molded article's susceptibility to size reduction when subjected to elevated temperatures for the first time after being manufactured. Shrinkage is determined by immersing in boiling water a blow molded article (e.g., a bottle) that has not previously been exposed to elevated temperatures. After 1 hour, the molded article is removed from the boiling water. The internal volume of the molded article before and after immersion in boiling water is measured. The shrinkage is calculated by subtracting the after-immersion volume from the pre-immersion volume and dividing that value by the pre-immersion volume.

For purposes of this application, "transmission ratio" is a measure of a blow molded article's susceptibility to localized haze when the article is contacted with human body oil (i.e., a fingerprint) and then exposed to elevated temperatures. To determine the transmission ratio, the blow molded article (e.g., bottle) is cut in half. One half of the article is maintained as the pre-boil control, and the other half is contacted with human body oil (touched by a finger) and then placed in boiling water for 1 hour. A laser light beam is then transmitted through the sidewall of each half-bottle and its intensity recorded. Transmission is measured by irradiating the sample with a 3 mW HeNe laser and measuring transmitted intensity using a digital photometer. Sample to detector distance is held constant at 8 cm. The transmission ratio is calculated as the ratio of the average transmitted intensity at three exposed locations (i.e., locations within the fingerprint spot) divided by the average transmitted intensity at two unexposed locations.

For purposes of this application, "stretch ratio" or "SR" or "S.R." is a measure of the degree of expansion (i.e., stretching) associated with blow molding a preform into an article (e.g., a bottle). Stretch ratio is defined by the following equation:

$$S.R. = \frac{D_B}{D_P} * \frac{L_B}{L_P}$$

where $D_B$ is the maximum outer diameter of the sidewall of the blow molded article (e.g., bottle), $D_P$ is the minimum outer diameter of the sidewall of the preform, $L_B$ is the overall length of the blow molded article (e.g., bottle) minus 20 mm for the finish, and $L_P$ is the overall length of the preform minus 20 mm for the finish.

For purposes of this application, "calculated stretch ratio" or "CSR" is defined by the following equation:

$$CSR = (0.022)(PT) + (0.074)(Tg) - 10$$

where PT is the preform temperature at the time of inflation and Tg is the glass transition temperature of the polymeric material from which the blow molded article is formed.

For purposes of this application, "preform temperature" or "PT" is defined as the temperature of the preform at the moment it is placed into the blow mold (~1 second prior to inflation).

For purposes of this application, "finish" is defined in one embodiment as as the threaded section of the bottle that accepts the closure (cap). It can also be defined as the neck of the bottle or the unstretched portion of the blow molded article.

For purposes of this application, "calculated preform temperature" or "CPT" defined by the following equation:

$$CPT = (45.44)(SR) - (3.36)(Tg) + 454$$

where SR is the stretch ratio of the blow molded article with respect to the preform and Tg is the glass transition temperature of the polymeric material from which the blow molded article is formed.

For purposes of this application, "birefringence" or "$\Delta n$" is a measure of orientation and is defined by the following equation:

$$\Delta n = \left(\frac{(TE + TEP)}{2}\right) - TM$$

where TE is the index of refraction measured in the axial dimension, TEP is the index of refraction measured in the hoop dimension and TM is the index of refraction measured in the thickness dimension. Birefringence measurements herein refer to measurements taken in the sidewall of the blow molded article (e.g., bottle), not immediately adjacent to the base or finish.

For purposes of this application, "Tg" is defined as the glass transition temperature measured by differential scanning calorimetry (DSC) at a scan rate of 20° C./min. The sample being measured should have been heated above its melting point and quenched prior to the scan.

"Container" is any receptacle capable of holding foodstuffs and capable of resisting immersion in boiling water.

The term "bottle" as used herein is understood to mean a container capable of holding liquid. The bottles of the invention can be used, for example, for administering liquids to human beings who are fed by bottles, such as babies.

It is also envisioned that this invention could be applied to bottles, containers, or articles where resistance to immersion in boiling water is desired. Such applications include containers used to hold food during boiling-water pasteurization.

"Polymeric material" refers to any material produced by the polymerization of one or more monomers and capable of being molded.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically, the difunctional carboxylic acid can be a dicarboxylic acid and the difunctional hydroxyl compound can be a dihydric alcohol such as, for example, glycols and diols.

The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone.

The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof.

Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

Articles of the invention and methods of producing them

The invention is generally directed to baby bottles and other articles produced by blow molding from polymeric materials having glass transition temperatures ranging from 100° C. to 130° C., as well as to processes for producing them. These articles can be exposed to boiling water and can be produced by using a suitable combination of a stretch ratio of less than 3 and a preform temperature at least 20° C. greater than the glass transition temperature (Tg) of the polymeric material. Processes useful in the methods of the invention include stretch blow molding, injection blow molding, extrusion blow molding, and any process in which an initial preform or parison is blown into a final article.

One typical method to measure orientation, or lack thereof, is through optical measurements of refractive index, which can be used to calculate birefringence. In one embodiment, the articles produced according to this invention have birefringence values equal to or less than a value determined by the equation $(103-Tg)/735$, where Tg is the glass transition temperature of the polymer measured in degrees C. For a polymer with a Tg of 125° C., birefringence values must therefore be less than 0.030. For a polymer with a Tg of 120° C., birefringence values must therefore be less than 0.023. For a polymer with a Tg of 115° C., birefringence values must therefore be less than 0.016. For a polymer with a Tg of 110° C., birefringence values must therefore be less than 0.010.

One advantage provided by the present invention is the ability to make baby bottles and other articles capable of being exposed to boiling water with polymeric materials, such as polyesters, having glass transition temperatures ranging from 100° C. to 130° C., and having a certain combination of two or more of high impact strength, toughness, good color, clarity, low haze values, chemical resistance, and hydrolytic stability.

For example, articles produced using conventional stretch ratios of 3 or higher and low preform temperatures result in articles with limited chemical resistance, which upon normal handling conditions and immersion in boiling water develop haze, shrinkage, and/or distortion. In one example of the bottles made by conventional methods, fingerprints on the bottle become permanently etched on the surface of the bottle after boiling the bottle in water, resulting in unacceptable haze. The chemical in this situation is simply the oil omnipresent on human skin. In contrast, the articles made by the methods of the invention display suitable haze values for applications that require clarity, such as baby bottle applications.

The development of fingerprint haze due to boiling water exposure can be quantified by measuring the relative light intensity of a laser light beam transmitted through a fingerprinted bottle both before and after exposure to boiling water. The ratio of laser light intensity before exposure divided by the laser light intensity after exposure is herefore defined as the transmission ratio. Transmission ratio values less than 0.80 corresponded to a noticeable observation of haze. In one embodiment, the articles of this invention have transmission ratios of 0.80 or greater. In one embodiment, the articles of this invention have transmission ratios of 0.85 or greater. In one embodiment, the articles of this invention have transmission ratios of 0.90 or greater. In one embodiment, the articles of this invention have transmission ratios of 0.95 or greater. Also, bottles and articles made by conventional methods using polymeric materials with a Tg from 100 to 130° C. show shrinkage or distortion after being immersed in boiling water for the first time. Articles made according to the invention show shrinkage of 5% or less after being immersed in boiling water for one hour. In another embodiment, articles made according to the invention show shrinkage of 4% or less after being immersed in boiling water for one hour. In another embodiment, articles made according to the invention show shrinkage of 3% or less after being immersed in boiling water for one hour. In another embodiment, articles made according to the invention show shrinkage of 2% or less after being immersed in boiling water for one hour. In another embodiment, articles made according to the invention show shrinkage of 1% or less after being immersed in boiling water for one hour.

The articles of the invention are produced by using a suitable combination of a stretch ratio of less than 3 and a preform temperature at least 20° C. greater than the Tg of the polymeric material. In general, as the stretch ratio increases, so does the temperature of the preform used to produce an article of the invention. This relation can be described by the following equation: % Shrink=$[15.9+(1.42*SR)-(0.105*Tg)-(0.0312*PT)]^3$, where SR is the stretch ratio, Tg is the glass transition of the polymer in degrees C., and PT is the temperature of the preform in degrees C. Thus, if the Tg of the polymer was 115° C. and the stretch ratio was 1.4, then the temperature of the preform would have to be 132° C. or greater to obtain shrinkage values of 5% or less. Alternatively, if the Tg of the polymer was 115° C. and the stretch ratio was 2.0, then the temperature of the preform would have to be 159° C. or greater to obtain shrinkage values of 5% or less after 1 hour of boiling. The maximum allowable shrinkage (% shrink) is 5%, preferably 4%, more preferably 3%, most preferably 2%. Typical PET bottles are blown with an air pressure of 100 psi. In general, reducing the blow pressure reduces the degree of orientation in the bottle. In one embodiment of the invention, the blow pressure is reduced during the blowing of the article of the invention. In another embodiment, the bottles of the invention are produced at air pressures of 75 psi or below, 50 psi or below, or 25 psi or below.

Any air pressure described herein can be combined with any preform temperature at the time of inflation and/or any inflation rate described herein. Any preform temperature at the time of inflation described herein can be combined with any inflation rate and/or air pressure described herein. Any inflation rate described herein can be combined with any preform temperature at the time of inflation and/or air pressure.

In another embodiment, the bottles of the invention are produced at air pressures of at least one of the following: 1 to 75 psi; 1 to 70 psi; 1 to 65 psi; 1 to 60 psi; 1 to 55 psi; 1 to 50 psi; 1 to 45 psi; 1 to 40 psi; 1 to 35 psi; 1 to 30 psi; 1 to 25 psi; 1 to 20 psi; 1 to 15 psi; 1 to 10 psi; 1 to 5 psi; 5 to 75 psi; 5 to 70 psi; 5 to 65 psi; 5 to 60 psi; 5 to 55 psi; 5 to 50 psi; 5 to 45 psi; 5 to 40 psi; 5 to 35 psi; 5 to 30 psi; 5 to 25 psi; 5 to 20 psi; 5 to 15 psi; 5 to 10 psi; 10 to 75 psi; 10 to 70 psi; 10 to 65 psi; 10 to 60 psi; 10 to 55 psi; 10 to 50 psi; 10 to 45 psi; 10 to 40 psi; 10 to 35 psi; 10 to 30 psi; 10 to 25 psi; 10 to 20 psi; 10 to 15 psi; 15 to 75 psi; 15 to 70 psi; 15 to 65 psi; 15 to 60 psi; 15 to 55 psi; 15 to 50 psi; 15 to 45 psi; 15 to 40 psi; 15 to 35 psi; 15 to 30 psi; 15 to 25 psi; 15 to 20 psi; 20 to 75 psi; 20 to 70 psi; 20 to 65 psi; 20 to 60 psi; 20 to 55 psi; 20 to 50 psi; 20 to 45 psi; 20 to 40 psi; 20 to 35 psi; 20 to 30 psi; 20 to 25 psi; 25 to 75 psi; 25 to 70 psi; 25 to 65 psi; 25 to 60 psi; 25 to 55 psi; 25 to 50 psi; 25 to 45 psi; 25 to 40 psi; 25 to 35 psi; 25 to 30 psi; 30 to 75 psi; 30 to 70 psi; 30 to 65 psi; 30 to 60 psi; 30 to 55 psi; 30 to 50 psi; 30 to 45 psi; 30 to 40 psi; 30 to 35 psi; 40 to 75 psi; 40 to 70 psi; 40 to 65 psi; 40 to 60 psi; 40 to 55 psi; 40 to 50 psi; 40 to 45 psi; 45 to 75 psi; 45 to 70 psi; 45 to 65 psi; 45 to 60 psi; 45 to 55 psi; 45 to 50 psi; 50 to 75 psi; 50 to 70 psi; 50 to 65 psi; 50 to 60 psi; 50 to 55 psi; 55 to 75 psi; 55 to 70 psi; 55 to 65 psi; 55 to 60 psi; 60 to 75 psi; 60 to 70 psi; 60 to 65 psi; 65 to 75 psi; or 65 to 70 psi.

In one embodiment, articles of the invention are produced with a stretch ratio of less than or equal to 3. In other embodiments, the stretch ratio is less than or equal to 2.7, less than or equal to 2.5, or less than or equal to 2.0. In yet another embodiment, the stretch ratio ranges from 1.2 to 2.0. In another embodiment, the stretch ratio ranges from 1.3 to 1.7. In one embodiment, the preform temperature at the time of inflation is Tg+20° C. or higher.

In another embodiment, the preform temperature at the time of inflation is greater than a calculated preform temperature (CPT) determined by the following equation: CPT=(45.44)(SR)−(3.36)(Tg)+454, wherein SR is the stretch ratio of the bottle relative to the preform and Tg is the glass transition temperature of the polymeric material being blow molded. In one embodiment, the preform temperature at the time of inflation is greater than the calculated preform temperature (CPT) by one or more of the following amounts: 1 to 80° C., 5 to 50° C., and/or 10 to 40° C. In another embodiment, the preform temperature at the time of inflation is Tg+30° C. or higher. In another embodiment, the stretch ratio is less than 2 and the preform temperature is Tg+30° C. or higher. The preform temperature at the time of inflation refers to the temperature of the preform at the moment it is placed into the blow mold (~1 second prior to inflation).

In certain embodiments of the invention, the preform temperature at the time of inflation can be at least one of the following temperatures: higher than Tg+20° C., higher than Tg+25° C., higher than Tg+30° C., higher than Tg+35° C., higher than Tg+40° C., higher than Tg+45° C., higher than Tg+50° C., higher than Tg+55° C., higher than Tg+60° C., higher than Tg+65° C., higher than Tg+70° C., from Tg+20° C. to Tg+70° C., from Tg+20° C. to Tg+65° C., from Tg+20° C. to Tg+60° C., from Tg+20° C. to Tg+55° C., from Tg+20° C. to Tg+50° C., from Tg+20° C. to Tg+45° C., from Tg+20° C. to Tg+40° C., from Tg+20° C. to Tg+35° C., from Tg+20° C. to Tg+30° C., from Tg+20° C. to Tg+25° C., from Tg+25° C. to Tg+70° C., from Tg+25° C. to Tg+65° C., from Tg+25° C. to Tg+60° C., from Tg+25° C. to Tg+55° C., from Tg+25° C. to Tg+50° C., from Tg+25° C. to Tg+45° C., from Tg+25° C. to Tg+40° C., from Tg+25° C. to Tg+35° C., from Tg+30° C. to Tg+70° C., from Tg+30° C. to Tg+65° C., from Tg+30° C. to Tg+60° C., from Tg+30° C. to Tg+55° C., from Tg+30° C. to Tg+50° C., from Tg+30° C. to Tg+45° C., from Tg+30° C. to Tg+40° C., from Tg+35° C. to Tg+70° C., from Tg+35° C. to Tg+65° C., from Tg+35° C. to Tg+60° C., from Tg+35° C. to Tg+55° C., from Tg+35° C. to Tg+50° C., from Tg+35° C. to Tg+45° C., from Tg+35° C. to Tg+40° C., from Tg+40° C. to Tg+70° C., from Tg+40° C. to Tg+65° C., from Tg+40° C. to Tg+60° C., from Tg+40° C. to Tg+55° C., from Tg+40° C. to Tg+50° C., from Tg+40° C. to Tg+45° C., from Tg+45° C. to Tg+70° C., from Tg+45° C. to Tg+65° C., from Tg+45° C. to Tg+60° C., from Tg+45° C. to Tg+55° C., from Tg+45° C. to Tg+50° C., from Tg+50° C. to Tg+70° C., from Tg+50° C. to Tg+65° C., from Tg+50° C. to Tg+60° C., from Tg+55° C. to Tg+70° C., from Tg+55° C. to Tg+65° C., from Tg+55° C. to Tg+60° C., from Tg+60° C. to Tg+70° C., from Tg+60° C. to Tg+65° C., and from Tg+65° C. to Tg+70° C.

In certain embodiments of the invention, the preform temperature at the time of inflation can be at least one of the following temperatures when using any one of the compositions of the invention regardless of the number of steps in the process: 130° C. to 220° C.; 130° C. to 215° C.; 130° C. to 210° C.; 130° C. to 205° C.; 130° C. to 200° C.; 130° C. to 195° C.; 130° C. to 190° C.; 130° C. to 185° C.; 130° C. to 180° C.; 130° C. to 175° C.; 130° C. to 170° C.; 130° C. to 165° C.; 130° C. to 160° C.; 130° C. to 155° C.; 130° C. to 150° C.; 130° C. to 145° C.; 130° C. to 140° C.; 130° C. to 135° C.; 135° C. to 220° C.; 135° C. to 215° C.; 135° C. to 210° C.; 135° C. to 205° C.; 135° C. to 200° C.; 135° C. to 195° C.; 135° C. to 190° C.; 135° C. to 185° C.; 135° C. to 180° C.; 135° C. to 175° C.; 135° C. to 170° C.; 135° C. to 165° C.; 135° C. to 160° C.; 135° C. to 155° C.; 135° C. to 150° C.; 135° C. to 145° C.; 135° C. to 140° C.; 140° C. to 220° C.; 140° C. to 215° C.; 140° C. to 210° C.; 140° C. to 205° C.; 140° C. to 200° C.; 140° C. to 195° C.; 140° C. to 190° C.; 140° C. to 185° C.; 140° C. to 180° C.; 140° C. to 175° C.; 140° C. to 170° C.; 140° C. to 165° C.; 140° C. to 160° C.; 140° C. to 155° C.; 140° C. to 150° C.; 140° C. to 145° C.; 145° C. to 220° C.; 145° C. to 215° C.; 145° C. to 210° C.; 145° C. to 205° C.; 145° C. to 200° C.; 145° C. to 195° C.; 145° C. to 190° C.; 145° C. to 185° C.; 145° C. to 180° C.; 145° C. to 175° C.; 145° C. to 170° C.; 145° C. to 165° C.; 145° C. to 160° C.; 145° C. to 155° C.; 145° C. to 150° C.; 150° C. to 220° C.; 150° C. to 215° C.; 150° C. to 210° C.; 150° C. to 205° C.; 150° C. to 200° C.; 150° C. to 195° C.; 150° C. to 190° C.; 150° C. to 185° C.; 150° C. to 180° C.; 150° C. to 175° C.; 150° C. to 170° C.; 150° C. to 165° C.; 150° C. to 160° C.; 150° C. to 155° C.; 155° C. to 220° C.; 155° C. to 215° C.; 155° C. to 210° C.; 155° C. to 205° C.; 155° C. to 200° C.; 155° C. to 195° C.; 155° C. to 190° C.; 155° C. to 185° C.; 155° C. to 180° C.; 155° C. to 175° C.; 155° C. to 170° C.; 155° C. to 165° C.; 155° C. to 160° C.; 160° C. to 220° C.; 160° C. to 215° C.; 160° C. to 210° C.; 160° C. to 205° C.; 160° C. to 200° C.; 160° C. to 195° C.; 160° C. to 190° C.; 160° C. to 185° C.; 160° C. to 180° C.; 160° C. to 175° C.; 160° C. to 170° C.; 160° C. to 165° C.; 165° C. to 220° C.; 165° C. to 215° C.; 165° C. to 210° C.; 165° C. to 205° C.; 165° C. to 200° C.; 165° C. to 195° C.; 165° C. to 190° C.; 165° C. to 185° C.; 165° C. to 180° C.; 165° C. to 175° C.; 165° C. to 170° C.; 170° C. to 220° C.; 170° C. to 215° C.; 170° C. to 210° C.; 170° C. to 205° C.; 170° C. to 200° C.; 170° C. to 195° C.; 170° C. to 190° C.; 170° C. to 185° C.; 170° C. to 180° C.; 170° C. to 175° C.; 175° C. to 220° C.; 175° C. to 215° C.; 175° C. to 210° C.; 175° C. to 205° C.; 175° C. to 200° C.; 175° C. to 195° C.; 175° C. to 190° C.; 175° C. to 185° C.; 175° C. to 180° C.; 180° C. to 220° C.; 180° C. to 215° C.; 180° C. to 210° C.; 180° C. to 205° C.; 180° C. to 200° C.; 180° C. to 195° C.; 180° C. to 190° C.; 180° C. to 185° C.; 185° C. to 220° C.; 185° C. to 215° C.; 185° C. to 210° C.; 185° C. to 205° C.; 185° C. to 200° C.; 185° C. to 195° C.; 185° C. to 190° C.; 190° C. to 220° C.; 190° C. to 215° C.; 190° C. to 210° C.; 190° C. to 205° C.; 190° C. to 200° C.; 190° C. to 195° C.; 195° C. to 220° C.; 195° C. to 215° C.; 195° C. to 210° C.; 195° C. to 205° C.; 195° C. to 200° C.; 200° C. to 220° C.; 200° C. to 215° C.; 200° C. to 210° C.; 200° C. to 205° C.; 205° C. to 220° C.; 205° C. to 215° C.; 205° C. to 210° C.; 210° C. to 220° C.; 210° C. to 215° C.; or 215° C. to 220° C.

In certain embodiments of the invention, the preform temperature at the time of inflation can be at least one of the following temperatures when using any one of the compositions useful in the invention and when using a four-step injection stretch blow molding process: 130° C. to 220° C.; 130° C. to 215° C.; 130° C. to 210° C.; 130° C. to 205° C.; 130° C. to 200° C.; 130° C. to 195° C.; 130° C. to 190° C.; 130° C. to 185° C.; 130° C. to 180° C.; 130° C. to 175° C.; 130° C. to 170° C.; 130° C. to 165° C.; 130° C. to 160° C.; 130° C. to 155° C.; 130° C. to 150° C.; 130° C. to 145° C.; 130° C. to 140° C.; 130° C. to 135° C.; 135° C. to 220° C.; 135° C. to 215° C.; 135° C. to 210° C.; 135° C. to 205° C.; 135° C. to 200° C.; 135° C. to 195° C.; 135° C. to 190° C.; 135° C. to 185° C.; 135° C. to 180° C.; 135° C. to 175° C.; 135° C. to 170° C.; 135° C. to 165° C.; 135° C. to 160° C.; 135° C. to 155° C.; 135° C. to 150° C.; 135° C. to 145° C.; 135° C. to 140° C.; 140° C. to 220° C.; 140° C. to 215° C.; 140° C. to 210° C.; 140° C. to 205° C.; 140° C. to 200° C.; 140° C. to 195° C.; 140° C. to 190° C.; 140° C. to 185° C.; 140° C. to 180° C.; 140° C. to 175° C.; 140° C. to 170° C.; 140° C. to 165° C.; 140° C. to 160° C.; 140° C. to 155° C.; 140° C. to 150° C.; 140° C. to 145° C.; 145° C. to 220° C.; 145° C. to 215° C.; 145° C. to 210° C.; 145° C. to 205° C.; 145° C. to 200° C.; 145° C. to 195° C.; 145° C. to 190° C.; 145° C. to 185° C.; 145° C. to 180° C.; 145° C. to 175° C.; 145° C. to 170° C.; 145° C. to 165° C.; 145° C. to 160° C.; 145° C. to 155° C.; 145° C. to 150° C.; 150° C. to 220° C.; 150° C. to 215° C.; 150° C. to 210° C.; 150° C. to 205° C.; 150° C. to 200° C.; 150° C. to 195° C.; 150° C. to 190° C.; 150° C. to 185° C.; 150° C. to 180° C.; 150° C. to 175° C.; 150° C. to 170° C.; 150° C. to 165° C.; 150° C. to 160° C.; 150° C. to 155° C.; 155° C. to 220° C.; 155° C. to 215° C.; 155° C. to 210° C.; 155° C. to 205° C.; 155° C. to 200° C.; 155° C. to 195° C.; 155° C. to 190° C.; 155° C. to 185° C.; 155° C. to 180° C.; 155° C. to 175° C.; 155° C. to 170° C.; 155° C. to 165° C.; 155° C. to 160° C.; 160° C. to 220° C.; 160° C. to 215° C.; 160° C. to 210° C.; 160° C. to 205° C.; 160° C. to 200° C.; 160° C. to 195° C.; 160° C. to 190° C.; 160° C. to 185° C.; 160° C. to 180° C.; 160° C. to 175° C.; 160° C. to 170° C.; 160° C. to 165° C.; 165° C. to 220° C.; 165° C. to 215° C.; 165° C. to 210° C.; 165° C. to 205° C.; 165° C. to 200° C.; 165° C. to 195° C.; 165° C. to 190° C.; 165° C. to 185° C.; 165° C. to 180° C.; 165° C. to 175° C.; 165° C. to 170° C.; 170° C. to 220° C.; 170° C. to 215° C.; 170° C. to 210° C.; 170° C. to 205° C.; 170° C. to 200° C.; 175° C. to 195° C.; 175° C. to 190° C.; 175° C. to 185° C.; 175° C. to 180° C.; 180° C. to 220° C.; 180° C. to 215° C.; 180° C. to 210° C.; 180° C. to 205° C.; 180° C. to 200° C.; 180° C. to 195° C.; 180° C. to 190° C.; 180° C. to 185° C.; 185° C. to 220° C.; 185° C. to 215° C.; 185° C. to 210° C.; 185° C. to 205° C.; 185° C. to 200° C.; 185° C. to 195° C.; 185° C. to 190° C.; 190° C. to 220° C.; 190° C. to 215° C.; 190° C. to 210° C.; 190° C. to 205° C.; 190° C. to 200° C.; 190° C. to 195° C.; 195° C. to 220° C.; 195° C. to 215° C.; 195° C. to 210° C.; 195° C. to 205° C.; 195° C. to 200° C.; 200° C. to 220° C.; 200° C. to 215° C.; 200° C. to 210° C.; 200° C. to 205° C.; 205° C. to 220° C.; 205° C. to 215° C.; 210° C. to 220° C.; 210° C. to 215° C.; or 215° C. to 220° C.

In certain embodiments of the invention, the preform temperature at the time of inflation can be at least one of the following temperatures when using any one of the compositions useful in the invention and when using a three-step injection stretch blow molding process: 130° C. to 200° C.; 130° C. to 195° C.; 130° C. to 190° C.; 130° C. to 185° C.; 130° C. to 180° C.; 130° C. to 175° C.; 130° C. to 170° C.; 130° C. to 165° C.; 130° C. to 160° C.; 130° C. to 155° C.; 130° C. to 150° C.; 130° C. to 145° C.; 130° C. to 140° C.; 130° C. to 135° C.; 135° C. to 200° C.; 135° C. to 195° C.; 135° C. to 190° C.; 135° C. to 185° C.; 135° C. to 180° C.; 135° C. to 175° C.; 135° C. to 170° C.; 135° C. to 165° C.; 135° C. to 160° C.; 135° C. to 155° C.; 135° C. to 150° C.; 135° C. to 145° C.; 135° C. to 140° C.; 140° C. to 200° C.;

140° C. to 195° C.; 140° C. to 190° C.; 140° C. to 185° C.; 140° C. to 180° C.; 140° C. to 175° C.; 140° C. to 170° C.; 140° C. to 165° C.; 140° C. to 160° C.; 140° C. to 155° C.; 140° C. to 150° C.; 140° C. to 145° C.; 145° C. to 200° C.; 145° C. to 195° C.; 145° C. to 190° C.; 145° C. to 185° C.; 145° C. to 180° C.; 145° C. to 175° C.; 145° C. to 170° C.; 145° C. to 165° C.; 145° C. to 160° C.; 145° C. to 155° C.; 145° C. to 150° C.; 150° C. to 200° C.; 150° C. to 195° C.; 150° C. to 190° C.; 150° C. to 185° C.; 150° C. to 180° C.; 150° C. to 175° C.; 150° C. to 170° C.; 150° C. to 165° C.; 150° C. to 160° C.; 150° C. to 155° C.; 155° C. to 200° C.; 155° C. to 195° C.; 155° C. to 190° C.; 155° C. to 185° C.; 155° C. to 180° C.; 155° C. to 175° C.; 155° C. to 170° C.; 155° C. to 165° C.; 155° C. to 160° C.; 160° C. to 200° C.; 160° C. to 195° C.; 160° C. to 190° C.; 160° C. to 185° C.; 160° C. to 180° C.; 160° C. to 175° C.; 160° C. to 170° C.; 160° C. to 165° C.; 165° C. to 200° C.; 165° C. to 195° C.; 165° C. to 190° C.; 165° C. to 185° C.; 165° C. to 180° C.; 165° C. to 175° C.; 165° C. to 170° C.; 170° C. to 200° C.; 170° C. to 195° C.; 170° C. to 190° C.; 170° C. to 185° C.; 170° C. to 180° C.; 170° C. to 175° C.; 175° C. to 200° C.; 175° C. to 195° C.; 175° C. to 190° C.; 175° C. to 185° C.; 175° C. to 180° C.; 180° C. to 200° C.; 180° C. to 195° C.; 180° C. to 190° C.; 180° C. to 185° C.; 185° C. to 200° C.; 185° C. to 195° C.; 185° C. to 190° C.; 190° C. to 200° C.; 190° C. to 195° C.; or 195° C. to 200° C.

In certain embodiments of the invention, the preform temperature at the time of inflation can be at least one of the following temperatures when using any one of the compositions useful in the invention and when using a two-step reheat blow molding process: 130° C. to 200° C.; 130° C. to 195° C.; 130° C. to 190° C.; 130° C. to 185° C.; 130° C. to 180° C.; 130° C. to 175° C.; 130° C. to 170° C.; 130° C. to 165° C.; 130° C. to 160° C.; 130° C. to 155° C.; 130° C. to 150° C.; 130° C. to 145° C.; 130° C. to 140° C.; 130° C. to 135° C.; 135° C. to 200° C.; 135° C. to 195° C.; 135° C. to 190° C.; 135° C. to 185° C.; 135° C. to 180° C.; 135° C. to 175° C.; 135° C. to 170° C.; 135° C. to 165° C.; 135° C. to 160° C.; 135° C. to 155° C.; 135° C. to 150° C.; 135° C. to 145° C.; 135° C. to 140° C.; 140° C. to 200° C.; 140° C. to 195° C.; 140° C. to 190° C.; 140° C. to 185° C.; 140° C. to 180° C.; 140° C. to 175° C.; 140° C. to 170° C.; 140° C. to 165° C.; 140° C. to 160° C.; 140° C. to 155° C.; 140° C. to 150° C.; 140° C. to 145° C.; 145° C. to 200° C.; 145° C. to 195° C.; 145° C. to 190° C.; 145° C. to 185° C.; 145° C. to 180° C.; 145° C. to 175° C.; 145° C. to 170° C.; 145° C. to 165° C.; 145° C. to 160° C.; 145° C. to 155° C.; 145° C. to 150° C.; 150° C. to 200° C.; 150° C. to 195° C.; 150° C. to 190° C.; 150° C. to 185° C.; 150° C. to 180° C.; 150° C. to 175° C.; 150° C. to 170° C.; 150° C. to 165° C.; 150° C. to 160° C.; 150° C. to 155° C.; 155° C. to 200° C.; 155° C. to 195° C.; 155° C. to 190° C.; 155° C. to 185° C.; 155° C. to 180° C.; 155° C. to 175° C.; 155° C. to 170° C.; 155° C. to 165° C.; 155° C. to 160° C.; 160° C. to 200° C.; 160° C. to 195° C.; 160° C. to 190° C.; 160° C. to 185° C.; 160° C. to 180° C.; 160° C. to 175° C.; 160° C. to 170° C.; 160° C. to 165° C.; 165° C. to 200° C.; 165° C. to 195° C.; 165° C. to 190° C.; 165° C. to 185° C.; 165° C. to 180° C.; 165° C. to 175° C.; 165° C. to 170° C.; 170° C. to 200° C.; 170° C. to 195° C.; 170° C. to 190° C.; 170° C. to 185° C.; 170° C. to 180° C.; 170° C. to 175° C.; 175° C. to 200° C.; 175° C. to 195° C.; 175° C. to 190° C.; 175° C. to 185° C.; 175° C. to 180° C.; 180° C. to 200° C.; 180° C. to 195° C.; 180° C. to 190° C.; 180° C. to 185° C.; 185° C. to 200° C.; 185° C. to 195° C.; 185° C. to 190° C.; 190° C. to 200° C.; 190° C. to 195° C.; or 195° C. to 200° C.

The preform temperatures from top to bottom of the preform at the time of inflation can remain constant but are not required to remain constant.

In certain embodiments of the invention, inflation rates during the injection stretch blow molding process or reheat blow molding process can be in the range of one of the following: 1 to 800 cm3/s; 1 to 750 cm3/s; 1 to 700 cm3/s; 1 to 650 cm3/s; 1 to 600 cm3/s; 1 to 550 cm3/s; 1 to 500 cm3/s; 1 to 450 cm3/s; 1 to 400 cm3/s; 1 to 350 cm3/s; 1 to 300 cm3/s; 1 to 250 cm3/s; 1 to 200 cm3/s; 1 to 150 cm3/s; 1 to 100 cm3/s; 1 to 50 cm3/s; 5 to 750 cm3/s; 5 to 700 cm3/s; 5 to 650 cm3/s; 5 to 600 cm3/s; 5 to 550 cm3/s; 5 to 500 cm3/s; 5 to 450 cm3/s; 5 to 400 cm3/s; 5 to 350 cm3/s; 5 to 300 cm3/s; 5 to 250 cm3/s; 5 to 200 cm3/s; 5 to 150 cm3/s; 5 to 100 cm3/s; 5 to 50 cm3/s; 10 to 750 cm3/s; 10 to 700 cm3/s; 10 to 650 cm3/s; 10 to 600 cm3/s; 10 to 550 cm3/s; 10 to 500 cm3/s; 10 to 450 cm3/s; 10 to 400 cm3/s; 10 to 350 cm3/s; 10 to 300 cm3/s; 10 to 250 cm3/s; 10 to 200 cm3/s; 10 to 150 cm3/s; 10 to 100 cm3/s; 10 to 95 cm3/s; 10 to 90 cm3/s; 10 to 85 cm3/s; 10 to 80 cm3/s; 10 to 75 cm3/s; 10 to 70 cm3/s; 10 to 65 cm3/s; 10 to 60 cm3/s; 10 to 55 cm3/s; 10 to 50 cm3/s; 10 to 45 cm3/s; 10 to 40 cm3/s; 10 to 35 cm3/s; 10 to 30 cm3/s; 10 to 25 cm3/s; 10 to 20 cm3/s; 10 to 15 cm3/s; 15 to 100 cm3/s; 15 to 95 cm3/s; 15 to 90 cm3/s; 15 to 85 cm3/s; 15 to 80 cm3/s; 15 to 75 cm3/s; 15 to 70 cm3/s; 15 to 65 cm3/s; 15 to 60 cm3/s; 15 to 55 cm3/s; 15 to 50 cm3/s; 15 to 45 cm3/s; 15 to 40 cm3/s; 15 to 35 cm3/s; 15 to 30 cm3/s; 15 to 25 cm3/s; 15 to 20 cm3/s; 20 to 100 cm3/s; 20 to 95 cm3/s; 20 to 90 cm3/s; 20 to 85 cm3/s; 20 to 80 cm3/s; 20 to 75 cm3/s; 20 to 70 cm3/s; 20 to 65 cm3/s; 20 to 60 cm3/s; 20 to 55 cm3/s; 20 to 50 cm3/s; 20 to 45 cm3/s; 20 to 40 cm3/s; 20 to 35 cm3/s; 20 to 30 cm3/s; 20 to 25 cm3/s; 20 to 100 cm3/s; 20 to 95 cm3/s; 20 to 90 cm3/s; 20 to 85 cm3/s; 20 to 80 cm3/s; 20 to 75 cm3/s; 20 to 70 cm3/s; 20 to 65 cm3/s; 20 to 60 cm3/s; 20 to 55 cm3/s; 20 to 50 cm3/s; 20 to 45 cm3/s; 20 to 40 cm3/s; 20 to 35 cm3/s; 20 to 30 cm3/s; 20 to 25 cm3/s; 25 to 100 cm3/s; 25 to 95 cm3/s; 25 to 90 cm3/s; 25 to 85 cm3/s; 25 to 80 cm3/s; 25 to 75 cm3/s; 25 to 70 cm3/s; 25 to 65 cm3/s; 25 to 60 cm3/s; 25 to 55 cm3/s; 25 to 50 cm3/s; 25 to 45 cm3/s; 25 to 40 cm3/s; 25 to 35 cm3/s; 25 to 30 cm3/s; 25 to 25 cm3/s; 30 to 100 cm3/s; 30 to 95 cm3/s; 30 to 90 cm3/s; 30 to 85 cm3/s; 30 to 80 cm3/s; 30 to 75 cm3/s; 30 to 70 cm3/s; 30 to 65 cm3/s; 30 to 60 cm3/s; 30 to 55 cm3/s; 30 to 50 cm3/s; 30 to 45 cm3/s; 30 to 40 cm3/s; 30 to 35 cm3/s; 35 to 100 cm3/s; 35 to 95 cm3/s; 35 to 90 cm3/s; 35 to 85 cm3/s; 35 to 80 cm3/s; 35 to 75 cm3/s; 35 to 70 cm3/s; 35 to 65 cm3/s; 35 to 60 cm3/s; 35 to 55 cm3/s; 35 to 50 cm3/s; 35 to 45 cm3/s; 35 to 40 cm3/s; 40 to 100 cm3/s; 40 to 95 cm3/s; 40 to 90 cm3/s; 40 to 85 cm3/s; 40 to 80 cm3/s; 40 to 75 cm3/s; 40 to 70 cm3/s; 40 to 65 cm3/s; 40 to 60 cm3/s; 40 to 55 cm3/s; 40 to 50 cm3/s; 40 to 45 cm3/s; 45 to 100 cm3/s; 45 to 95 cm3/s; 45 to 90 cm3/s; 45 to 85 cm3/s; 45 to 80 cm3/s; 45 to 75 cm3/s; 45 to 70 cm3/s; 45 to 65 cm3/s; 45 to 60 cm3/s; 45 to 55 cm3/s; 45 to 50 cm3/s; 50 to 100 cm3/s; 50 to 95 cm3/s; 50 to 90 cm3/s; 50 to 85 cm3/s; 50 to 80 cm3/s; 50 to 75 cm3/s; 50 to 70 cm3/s; 50 to 65 cm3/s; 50 to 60 cm3/s; 50 to 55 cm3/s; 55 to 100 cm3/s; 55 to 95 cm3/s; 55 to 90 cm3/s; 55 to 85 cm3/s; 55 to 80 cm3/s; 55 to 75 cm3/s; 55 to 70 cm3/s; 55 to 65 cm3/s; 55 to 60 cm3/s; 60 to 100 cm3/s; 60 to 95 cm3/s; 60 to 90 cm3/s; 60 to 85 cm3/s; 60 to 80 cm3/s; 60 to 75 cm3/s; 60 to 70 cm3/s; 60 to 65 cm3/s; 65 to 100 cm3/s; 65 to 95 cm3/s; 65 to 90 cm3/s; 65 to 85 cm3/s; 65 to 80 cm3/s; 65 to 75 cm3/s; 65 to 70 cm3/s; 70 to 100 cm3/s; 70 to 95 cm3/s; 70 to 90 cm3/s; 70 to 85 cm3/s; 70 to 80 cm3/s; 70 to 75 cm3/s; 75 to 100 cm3/s; 75 to 95 cm3/s; 75 to 90 cm3/s; 75 to 85 cm3/s; 75 to 80 cm3/s; 80 to 100 cm3/s; 80 to 95 cm3/s; 80 to 90 cm3/s; 80 to 85 cm3/s; 85 to 100 cm3/s; 85 to 95 cm3/s;

85 to 90 cm3/s; 90 to 100 cm3/s; 90 to 95 cm3/s; or 95 to 100 cm3/s. The inflation rate is a measure of how fast the bottle preform is inflating in the mold which is measured by taking the volume of bottle minus the volume of preform divided by the inflation time. It can also be measured by measuring the flow rate of gas into the mold or by any other method known in the art.

In certain embodiments of the invention, the stretch ratio of the final article relative to the preform can be at least one of the following ratios: 1.2 to less than 3, 1.2 to 3, 1.2 to 2.7, 1.2 to 2.5, 1.2 to 2.0, 1.2 to 1.9, 1.2 to 1.8, 1.2 to 1.7, 1.2 to 1.6, 1.2 to 1.5, 1.2 to 1.4, 1.2 to 1.3, 1.3 to less than 3, 1.3 to 3, 1.3 to 2.7, 1.3 to 2.5, 1.3 to 2.0, 1.3 to 1.9, 1.3 to 1.8, 1.3 to 1.7, 1.3 to 1.6, 1.3 to 1.5, 1.3 to 1.4, 1.4 to less than 3, 1.4 to 3, 1.4 to 2.7, 1.4 to 2.5, 1.4 to 2.0, 1.4 to 1.9, 1.4 to 1.8, 1.4 to 1.7, 1.4 to 1.6, 1.4 to 1.5, 1.5 to less than 3, 1.5 to 3, 1.5 to 2.7, 1.5 to 2.5, 1.5 to 2.0, 1.5 to 1.9, 1.5 to 1.8, 1.5 to 1.7, 1.5 to 1.6, 1.6 to less than 3, 1.6 to 3, 1.6 to 2.7, 1.6 to 2.5, 1.6 to 2.0, 1.6 to 1.9, 1.6 to 1.8, 1.6 to 1.7, 1.7 to less than 3, 1.7 to 3, 1.7 to 2.7, 1.7 to 2.5, 1.7 to 2.0, 1.7 to 1.9, 1.7 to 1.8, 1.8 to less than 3, 1.8 to 3, 1.8 to 2.7, 1.8 to 2.5, 1.8 to 2.0, 1.8 to 1.9, 1.9 to less than 3, 1.9 to 3, 1.9 to 2.7, 1.9 to 2.5, 1.9 to 2.0, 2.0 to less than 3, 2.0 to 3, 2.0 to 2.7, 2.0 to 2.5, 2.7 to less than 3, 2.7 to 3, 2.5 to 2.7, 2.5 to less than 3, 2.5 to 3, less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, and less than 1.5.

The preferred preform for this invention would have a length of 90% to 100% of the final bottle length to provide an axial stretch ratio of 1.0 to 1.1, and a diameter of 60% to 100% of the final bottle diameter to provide a radial stretch ratio of 1.0 to 1.7. It is recognized that design considerations may require that the finish diameter be smaller than the bottle diameter, which may result in a practical diameter for the preform being 60% to 80% of the final bottle diameter to provide a radial stretch ratio of 1.3 to 1.7. It is also recognized that the preform may require some degree of taper to assist in removal from the mold. In this case, the taper should be kept to a minimum in order to minimize the radial stretch ratio at the bottom of the preform.

It is contemplated that the processes of the invention can be carried out at a suitable combination of any of the stretch ratios described herein, any of the preform temperatures described herein, and any of the blow pressures described herein, unless otherwise stated. It is also contemplated that an article made by a process of the invention can possess a suitable combination of any of the haze values described herein, any of the birefringence values described herein, and any of the shrinkage values described herein, unless otherwise stated.

In another embodiment, the wall thickness of the bottle is increased. For example, in one embodiment, the thickness of the bottles is greater than 0.5 mm, preferably greater than 0.75 mm, more preferably greater than 1 mm. In one embodiment, the articles made according to the invention and/or the polymeric material compositions useful in the invention, with or without toners, can have color values L*, a* and b*, which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In certain embodiments, the b* values for the polyesters useful in the invention can be from −10 to less than 10 and the L* values can be from 50 to 90. In other embodiments, the b* values for the polyesters useful in the invention can be present in one of the following ranges: −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 50 to 60; 50 to 70; 50 to 80; 50 to 90; 60 to 70; 60 to 80; 60 to 90; 70 to 80; 79 to 90.

Articles made according to the invention can be immersed in boiling water without showing substantial detrimental shrinkage or distortion. Therefore, the invention is suitable for producing blow molded articles where those characteristics are desired. Examples of articles according to the invention include containers, bottles, baby bottles, food containers, and/or foodstuff containers; containers used in boiling-water pasteurization; and containers in which to carry out sterilization, such as Infant-care sterilization containers, etc. Infant-care sterilization containers are containers configured to hold infant-care products for use in in-home sterilization of infant-care products. In one embodiment, the infant-care sterilization container is a baby bottle sterilization container.

In one embodiment, baby bottles, and infant-care sterilization containers have at least one additional property chosen from toughness, clarity, chemical resistance, Tg, hydrolytic stability, and dishwasher stability.

Polymeric Materials Useful in the Invention

There are various polymeric materials with Tg values ranging from 100° C. to 130° C. that could be used with this invention including, but not limited to, polyacrylics (e.g. PMMA—polymethyl methacrylate, SAN styrene-acrylonitrile copolymer), polystyrenes, polyesters (e.g. PEN), and blends thereof. There is also a variety of other blends that can provide a Tg in the desired range, such as polycarbonate/polyester blends.

One useful family of polymers that can be employed with the present invention are polyesters. One family of polyesters that could be used with this invention includes polyesters formed from terephthalic acid; 1,4-cyclohexanedimethanol; and 2,2,4,4-tetramethyl-1,3-cyclobutanediol.

Polyesters that can be used in the baby bottles of the present invention can be typically prepared from dicarboxylic acids and diols, which react in substantially equal proportions and are incorporated into the polyester polymer as their corresponding residues. The polyesters of the baby bottles of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % 2,2,4,4-tetramethyl-1,3-cyclobutanediol, based on the total diol residues, means the polyester contains 30 mole % 2,2,4,4-tetramethyl-1,3-cyclobutanediol residues out of a total of 100 mole % diol residues. Thus, there are 30 moles of 2,2,4,4-tetramethyl-1,3-cyclobutanediol residues among every 100 moles of diol residues.

In other embodiments of the invention, the Tg of the polymeric material, such as polyacrylics, polystyrenes, polyesters, blends thereof, and polycarbonate/polyester blends useful in the invention can be at least one of the following ranges: 100 to 130° C.; 100 to 125° C.; 100 to 120° C.; 100 to 115° C.; 100 to 110° C.; 100 to 105° C.; 105 to 130° C.; 105 to 125° C.; 105 to 120° C.; 105 to 115° C.; 105 to 110° C.; 110 to 130° C.; 110 to 125° C.; 110 to 120° C.; 110 to 115° C.; 115 to 130° C.; 115 to 125° C.; 115 to 120° C.; 120 to 130° C.; 120 to 125° C.; 125 to 130° C.

In other embodiments of the invention, the Tg of the polymeric material, such as polyacrylics, polystyrenes, polyesters, blends thereof, and polycarbonate/polyester blends, useful in the invention can be at least one of the following ranges: 110 to 120° C.; 111 to 120° C.; 112 to 120° C.; 113 to 120° C.; 114 to 120° C.; 115 to 120° C.; 116 to 120° C.; 117 to 120° C.; 118 to 120° C.; 119 to 120° C.; 110 to 119° C.; 111 to 119° C.; 112 to 119° C.; 113 to 119° C.; 114 to 119° C.; 115 to 119° C.; 116 to 119° C.; 117 to 119° C.; 118 to 119° C.; 110 to 118° C.; 111 to 118° C.; 112 to 118° C.; 113 to 118° C.; 114 to 118° C.; 115 to 118° C.; 116 to 118° C.; 117 to 118° C.; 110 to 117° C.; 111 to 117° C.; 112 to 117° C.; 113 to 117° C.; 114 to 117° C.; 115 to 117° C.; 116 to 117° C.; 110 to 116° C.; 111 to 116° C.; 112 to 116° C.; 113 to 116° C.; 114 to 116° C.; 115 to 116° C.; 110 to 115° C.; 111 to 115° C.; 112 to 115° C.; 113 to 115° C.; 114 to 115° C.; 110 to 114° C.; 111 to 114° C.; 112 to 114° C.; 113 to 114° C.; 110 to 113° C.; 111 to 113° C.; 112 to 113° C.; 110 to 112° C.; 111 to 112° C.; and 110 to 111° C.

In other embodiments of the invention, the glycol component for polyesters useful in the invention include but are not limited to at least one of the following combinations of ranges: 10 to 45 mole % 2,2,4,4-tetramethyl-1,3-cyclobutanediol and 55 to 90 mole % 1,4-cyclohexanedimethanol; 10 to 40 mole % 2,2,4,4-tetramethyl-1,3-cyclobutanediol and 60 to 90 mole % 1,4-cyclohexanedimethanol; 10 to 35 mole % 2,2,4,4-tetramethyl-1,3-cyclobutanediol and 65 to 90 mole % 1,4-cyclohexanedimethanol; 10 to 30 mole % 2,2,4,4-tetramethyl-1,3-cyclobutanediol and 70 to 90 mole % 1,4-cyclohexanedimethanol; 10 to 25 mole % 2,2,4,4-tetramethyl-1,3-cyclobutanediol and greater than 75 to 90 mole % 1,4-cyclohexanedimethanol; 10 to 20 mole % 2,2,4,4-tetramethyl-1,3-cyclobutanediol and 80 to 90 mole % 1,4-cyclohexanedimethanol; and 10 to 15 mole % 2,2,4,4-tetramethyl-1,3-cyclobutanediol and 85 to 90 mole % 1,4-cyclohexanedimethanol.

In other embodiments of the invention, the glycol component for polyesters useful in the invention include but are not limited to at least one of the following combinations of ranges: 28 to 37 mole % 2,2,4,4-tetramethyl-1,3-cyclobutanediol and 63 to 72 mole % 1,4-cyclohexanedimethanol; 29 to 37 mole % 2,2,4,4-tetramethyl-1,3-cyclobutanediol and 63 to 71 mole % 1,4-cyclohexanedimethanol; 30 to 37 mole % 2,2,4,4-tetramethyl-1,3-cyclobutanediol and 63 to 70 mole % 1,4-cyclohexanedimethanol; 31 to 37 mole % 2,2,4,4-tetramethyl-1,3-cyclobutanediol and 63 to 69 mole % 1,4-cyclohexanedimethanol; 32 to 37 mole % 2,2,4,4-tetramethyl-1,3-cyclobutanediol and 63 to 68 mole % 1,4-cyclohexanedimethanol; 33 to 37 mole % 2,2,4,4-tetramethyl-1,3-cyclobutanediol and 63 to 67 mole % 1,4-cyclohexanedimethanol; 34 to 37 mole % 2,2,4,4-tetramethyl-1,3-cyclobutanediol and 63 to 66 mole % 1,4-cyclohexanedimethanol; 35 to 37 mole % 2,2,4,4-tetramethyl-1,3-cyclobutanediol and 63 to 65 mole % 1,4-cyclohexanedimethanol; and 36 to 37 mole % 2,2,4,4-tetramethyl-1,3-cyclobutanediol and 63 to 64 mole % 1,4-cyclohexanedimethanol.

In other embodiments of the invention, the glycol component for polyesters useful in the invention include but are not limited to at least one of the following combinations of ranges: 28 to 36 mole % 2,2,4,4-tetramethyl-1,3-cyclobutanediol and 64 to 72 mole % 1,4-cyclohexanedimethanol; 29 to 36 mole % 2,2,4,4-tetramethyl-1,3-cyclobutanediol and 64 to 71 mole % 1,4-cyclohexanedimethanol; 30 to 36 mole % 2,2,4,4-tetramethyl-1,3-cyclobutanediol and 64 to 70 mole % 1,4-cyclohexanedimethanol; 31 to 36 mole % 2,2,4,4-tetramethyl-1,3-cyclobutanediol and 64 to 69 mole % 1,4-cyclohexanedimethanol; 32 to 36 mole % 2,2,4,4-tetramethyl-1,3-cyclobutanediol and 64 to 68 mole % 1,4-cyclohexanedimethanol; 33 to 36 mole % 2,2,4,4-tetramethyl-1,3-cyclobutanediol and 64 to 67 mole % 1,4-cyclohexanedimethanol; 34 to 36 mole % 2,2,4,4-tetramethyl-1,3-cyclobutanediol and 64 to 66 mole % 1,4-cyclohexanedimethanol; and 35 to 36 mole % 2,2,4,4-tetramethyl-1,3-cyclobutanediol and 64 to 65 mole % 1,4-cyclohexanedimethanol.

In other embodiments of the invention, the glycol component for polyesters useful in the invention include but are not limited to at least one of the following combinations of ranges: 28 to 35 mole % 2,2,4,4-tetramethyl-1,3-cyclobutanediol and 65 to 72 mole % 1,4-cyclohexanedimethanol; 29 to 35 mole % 2,2,4,4-tetramethyl-1,3-cyclobutanediol and 65 to 71 mole % 1,4-cyclohexanedimethanol; 30 to 35 mole % 2,2,4,4-tetramethyl-1,3-cyclobutanediol and 65 to 70 mole % 1,4-cyclohexanedimethanol; 31 to 35 mole % 2,2,4,4-tetramethyl-1,3-cyclobutanediol and 65 to 69 mole % 1,4-cyclohexanedimethanol; 32 to 35 mole % 2,2,4,4-tetramethyl-1,3-cyclobutanediol and 65 to 68 mole % 1,4-cyclohexanedimethanol; 33 to 35 mole % 2,2,4,4-tetramethyl-1,3-cyclobutanediol and 65 to 67 mole % 1,4-cyclohexanedimethanol; and 34 to 35 mole % 2,2,4,4-tetramethyl-1,3-cyclobutanediol and 65 to 66 mole % 1,4-cyclohexanedimethanol.

In other embodiments of the invention, the glycol component for polyesters useful in the invention include but are not limited to at least one of the following combinations of ranges: 28 to 34 mole % 2,2,4,4-tetramethyl-1,3-cyclobutanediol and 66 to 72 mole % 1,4-cyclohexanedimethanol; 29 to 34 mole % 2,2,4,4-tetramethyl-1,3-cyclobutanediol and 66 to 71 mole % 1,4-cyclohexanedimethanol; 30 to 34 mole % 2,2,4,4-tetramethyl-1,3-cyclobutanediol and 66 to 70 mole % 1,4-cyclohexanedimethanol; 31 to 34 mole % 2,2,4,4-tetramethyl-1,3-cyclobutanediol and 66 to 69 mole % 1,4-cyclohexanedimethanol; 32 to 34 mole % 2,2,4,4-tetramethyl-1,3-cyclobutanediol and 66 to 68 mole % 1,4-cyclohexanedimethanol; and 33 to 34 mole % 2,2,4,4-tetramethyl-1,3-cyclobutanediol and 66 to 67 mole % 1,4-cyclohexanedimethanol.

In other aspects of the invention, the glycol component for polyesters useful in the invention include but are not limited to at least one of the following combinations of ranges: 28 to 33 mole % 2,2,4,4-tetramethyl-1,3-cyclobutanediol and 67 to 72 mole % 1,4-cyclohexanedimethanol; 29 to 33 mole % 2,2,4,4-tetramethyl-1,3-cyclobutanediol and 67 to 71 mole % 1,4-cyclohexanedimethanol; 30 to 33 mole % 2,2,4,4-tetramethyl-1,3-cyclobutanediol and 67 to 70 mole % 1,4-cyclohexanedimethanol; 31 to 33 mole % 2,2,4,4-tetramethyl-1,3-cyclobutanediol and 67 to 69 mole % 1,4-cyclohexanedimethanol; and 32 to 33 mole % 2,2,4,4-tetramethyl-1,3-cyclobutanediol and 67 to 68 mole % 1,4-cyclohexanedimethanol.

In other aspects of the invention, the glycol component for polyesters useful in the invention include but are not limited to at least one of the following combinations of ranges: 28 to 32 mole % 2,2,4,4-tetramethyl-1,3-cyclobutanediol and 68 to 72 mole % 1,4-cyclohexanedimethanol; 29 to 32 mole % 2,2,4,4-tetramethyl-1,3-cyclobutanediol and 68 to 71 mole % 1,4-cyclohexanedimethanol; 30 to 32 mole % 2,2,4,4-tetramethyl-1,3-cyclobutanediol and 68 to 70 mole % 1,4-cyclohexanedimethanol; and 31 to 32 mole % 2,2,4,4-tetramethyl-1,3-cyclobutanediol and 68 to 69 mole % 1,4-cyclohexanedimethanol.

In other embodiments of the invention, the glycol component for polyesters useful in the invention include but are not limited to at least one of the following combinations of ranges: 28 to 31 mole % 2,2,4,4-tetramethyl-1,3-cyclobutanediol and 69 to 72 mole % 1,4-cyclohexanedimethanol; 29 to 31 mole % 2,2,4,4-tetramethyl-1,3-cyclobutanediol and 69 to 71 mole % 1,4-cyclohexanedimethanol; and 30 to 31 mole % 2,2,4,4-tetramethyl-1,3-cyclobutanediol and 69 to 70 mole % 1,4-cyclohexanedimethanol.

In other embodiments of the invention, the glycol component for polyesters useful in the invention include but are not limited to at least one of the following combinations of ranges: 28 to 30 mole % 2,2,4,4-tetramethyl-1,3-cyclobutanediol and 70 to 72 mole % 1,4-cyclohexanedimethanol; 29 to 30 mole % 2,2,4,4-tetramethyl-1,3-cyclobutanediol and 70 to 71 mole % 1,4-cyclohexanedimethanol; and 28 to 29 mole % 2,2,4,4-tetramethyl-1,3-cyclobutanediol and 71 to 72 mole % 1,4-cyclohexanedimethanol.

For certain embodiments of the invention, polyesters useful in the invention may exhibit at least one of the following inherent viscosities as determined in 60/40 (wt/wt) phenol/tetrachloroethane at a concentration of 0.5 g/100 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g; greater than 0.76 dL/g to 1.2 dL/g; greater than 0.76 dL/g to 1.1 dL/g; greater than 0.76 dL/g to 1 dL/g; greater than 0.76 dL/g to less than 1 dL/g; greater than 0.76 dL/g to 0.98 dL/g; greater than 0.76 dL/g to 0.95 dL/g; greater than 0.76 dL/g to 0.90 dL/g; greater than 0.80 dL/g to 1.2 dL/g; greater than 0.80 dL/g to 1.1 dL/g; greater than 0.80 dL/g to 1 dL/g; greater than 0.80 dL/g to less than 1 dL/g; greater than 0.80 dL/g to 1.2 dL/g; greater than 0.80 dL/g to 0.98 dL/g; greater than 0.80 dL/g to 0.95 dL/g; greater than 0.80 dL/g to 0.90 dL/g.

For certain embodiments of the invention, polyesters useful in the invention may exhibit at least one of the following inherent viscosities as determined in 60/40 (wt/wt) phenol/tetrachloroethane at a concentration of 0.5 g/100 ml at 25° C.: 0.58 to 0.70 dL/g; 0.58 to 0.69 dL/g; 0.58 to 0.68 dL/g; 0.58 to 0.67 dL/g; 0.58 to 0.66 dL/g; 0.58 to 0.65 dL/g; 0.58 to 0.64 dL/g; 0.58 to 0.63 dL/g; 0.58 to 0.62 dL/g; 0.58 to 0.61 dL/g; 0.58 to 0.60 dL/g; 0.58 to 0.59 dL/g; 0.59 to 0.70 dL/g; 0.59 to 0.69 dL/g; 0.59 to 0.68 dL/g; 0.59 to 0.67 dL/g; 0.59 to 0.66 dL/g; 0.59 to 0.65 dL/g; 0.59 to 0.64 dL/g; 0.59 to 0.63 dL/g; 0.59 to 0.62 dL/g; 0.59 to 0.61 dL/g; 0.59 to 0.60 dL/g; 0.60 to 0.70 dL/g; 0.60 to 0.69 dL/g; 0.60 to 0.68 dL/g; 0.60 to 0.67 dL/g; 0.60 to 0.66 dL/g; 0.60 to 0.65 dL/g; 0.60 to 0.64 dL/g; 0.60 to 0.63 dL/g; 0.60 to 0.62 dL/g; 0.60 to 0.61 dL/g; 0.61 to 0.70 dL/g; 0.61 to 0.69 dL/g; 0.61 to 0.68 dL/g; 0.61 to 0.67 dL/g; 0.61 to 0.66 dL/g; 0.61 to 0.65 dL/g; 0.61 to 0.64 dL/g; 0.61 to 0.63 dL/g; 0.61 to 0.62 dL/g; 0.62 to 0.70 dL/g; 0.62 to 0.69 dL/g; 0.62 to 0.68 dL/g; 0.62 to 0.67 dL/g; 0.62 to 0.66 dL/g; 0.62 to 0.65 dL/g; 0.62 to 0.64 dL/g; 0.62 to 0.63 dL/g; 0.63 to 0.70 dL/g; 0.63 to 0.69 dL/g; 0.63 to 0.68 dL/g; 0.63 to 0.67 dL/g; 0.63 to 0.66 dL/g; 0.63 to 0.65 dL/g; 0.63 to 0.64 dL/g; 0.64 to 0.70 dL/g; 0.64 to 0.69 dL/g; 0.64 to 0.68 dL/g; 0.64 to 0.67 dL/g; 0.64 to 0.66 dL/g; 0.64 to 0.65 dL/g; 0.65 to 0.70 dL/g; 0.65 to 0.69 dL/g; 0.65 to 0.68 dL/g; 0.65 to 0.67 dL/g; 0.65 to 0.66 dL/g; 0.66 to 0.70 dL/g; 0.66 to 0.69 dL/g; 0.66 to 0.68 dL/g; 0.66 to 0.67 dL/g; 0.67 to 0.70 dL/g; 0.67 to 0.69 dL/g; 0.67 to 0.68 dL/g; 0.68 to 0.70 dL/g; 0.68 to 0.69 dL/g; and 0.69 to 0.70 dL/g.

It is contemplated that compositions useful in the baby bottles of the invention can possess at least one of the inherent viscosity ranges described herein and at least one of the monomer ranges for the compositions described herein unless otherwise stated. It is also contemplated that compositions useful in the baby bottles of the invention can possess at least one of the Tg ranges described herein and at least one of the monomer ranges for the compositions described herein unless otherwise stated. It is also contemplated that compositions useful in the baby bottles of the invention can possess at least one of the inherent viscosity ranges described herein, at least one of the Tg ranges described herein, and at least one of the monomer ranges for the compositions described herein unless otherwise stated.

In one aspect of the invention, the mole % of cis-2,2,4,4-tetramethyl-1,3-cyclobutanediol useful in certain polyesters useful in the baby bottles of the invention is greater than 50 mole % or greater than 55 mole % of cis-2,2,4,4-tetramethyl-1,3-cyclobutanediol or greater than 70 mole % of cis-2,2,4,4-tetramethyl-1,3-cyclobutanediol; wherein the total mole percentage of cis-2,2,4,4-tetramethyl-1,3-cyclobutanediol and trans-2,2,4,4-tetramethyl-1,3-cyclobutanediol is equal to a total of 100 mole %. In another aspect of the invention, the mole % of cis-2,2,4,4-tetramethyl-1,3-cyclobutanediol useful in the baby bottles of the invention is 50 mole %. In another aspect of the invention, the mole % of cis-2,2,4,4- tetramethyl-1,3-cyclobutanediol useful in the baby bottles of the invention is from 40 to 70 mole %.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in bottles of the invention. In certain embodiments, terephthalic acid residues can make up a portion or all of the dicarboxylic acid component used to form the polyesters useful in the bottles of the invention at a concentration of at least 70 mole %, such as at least 80 mole %, at least 90 mole % at least 95 mole %, at least 99 mole %, or even 100 mole %. In certain embodiments, higher amounts of terephthalic acid can be used in order to produce a higher impact strength polyester useful in the baby bottles of the invention. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyester useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, 0.01 to 20 mole %, from 0.01 to 10 mole %, from 0.01 to 5 mole % and from 0.01 to 1 mole. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid. In another embodiment, the modifying aromatic dicarboxylic acid is naphthalenedicarboxylic acid. In yet another embodiment, the modifying aromatic dicarboxylic acid is trans-4,4'-stilbenedicarboxylic acid.

The carboxylic acid component of the polyesters useful in the baby bottles of the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

The 1,4-cyclohexanedimethanol may be cis, trans, or a mixture thereof, for example, a cis/trans ratio of 60:40 to 40:60. In another embodiment, the trans-1,4-cyclohexanedimethanol can be present in an amount of 60 to 80 mole %. In another embodiment, the trans-1,4-cyclohexanedimethanol can be present in an amount of 70 mole % and cis-1,4-cyclohexanedimethanol can be present in an amount of 30 mole %.

The glycol component of the polyester portion of the polyester composition useful in the baby bottles of the invention can contain 25 mole % or less of one or more modifying glycols which are not 2,2,4,4-tetramethyl-1,3-cyclobutanediol or 1,4-cyclohexanedimethanol; in one embodiment, the polyesters useful in the baby bottles of the invention may contain less than 15 mole % or of one or more modifying glycols. In another embodiment, the polyesters useful in the baby bottles of the invention can contain 10 mole % or less of one or more modifying glycols. In another embodiment, the polyesters useful in the baby bottles of the invention can contain 5 mole % or less of one or more modifying glycols. In another embodiment, the polyesters useful in the baby bottles of the invention can contain 3 mole % or less of one or more modifying glycols. In another embodiment, the polyesters useful in the baby bottles of the invention can contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the baby bottles of the invention refer to diols other than 2,2,4,4-tetramethyl-1,3-cyclobutanediol and 1,4-cyclohexanedimethanol and can contain 2 to 16 carbon atoms. Examples of suitable modifying glycols include, but are not limited to, ethylene glycol, 1,2-propanediol, 1,3-propanediol, neopentyl glycol, 1,4-butanediol, 1,5-pentanediol, 1,6-hexanediol, p-xylene glycol, or mixtures thereof. In one embodiment, the modifying glycol is ethylene glycol. In another embodiment, the modifying glycols include, but are not limited to, 1,3-propanediol and 1,4-butanediol. In another embodiment, ethylene glycol is excluded as a modifying diol. In another embodiment, 1,3-propanediol and 1,4-butanediol are excluded as modifying diols. In another embodiment, 2,2-dimethyl-1,3-propanediol is excluded as a modifying diol.

The polyesters and/or certain polyester/polycarbonate blends useful in the polyesters compositions useful in the baby bottles of the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues, respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the baby bottles of the invention can thus be linear or branched. The polycarbonate can also be linear or branched. In certain embodiments, the branching monomer or agent may be added prior to and/or during and/or after the polymerization of the polycarbonate.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

In one aspect, the polyesters useful in the baby bottles of the invention are made from no 1,3-propanediol, or, 1,4-butanediol, either singly or in combination. In other embodiments, 1,3-propanediol or 1,4-butanediol, either singly or in combination, may be used in the making of the polyesters of this invention.

In one aspect, the polyesters useful in the baby bottles of the invention contain no branching agent, or alternatively, at least one branching agent is added either prior to or during polymerization of the polyester.

In one aspect, the polyesters useful in the baby bottles of the invention contain at least one branching agent without regard to the method or sequence in which it is added.

In one aspect, the polyester compositions useful in the baby bottles of the invention contain polycarbonate.

In one aspect, the polyester compositions useful in the baby bottles of the invention contain no polycarbonate.

In one aspect, the polyester compositions useful in the baby bottles of the invention contain substantially no polycarbonate.

In one aspect, the polyester compositions useful in the baby bottles of the invention contain less than 15 weight % polycarbonate.

In one aspect, the polyester compositions useful in the baby bottles of the invention contain less than 10 weight % polycarbonate.

In one aspect, the polyesters useful in the baby bottles of the invention contain from 0.01 to less than 15 mole % ethylene glycol residues or 0.01 to less than 10 mole % ethylene glycol residues.

In one aspect, the polyesters useful in the baby bottles of the invention contain no ethylene glycol residues.

In one aspect, the polyesters useful in the baby bottles of the invention contain substantially no ethylene glycol residues.

In one aspect the polyester compositions useful in the baby bottles of the invention contain at least one thermal stabilizer and/or reaction products thereof.

In addition, the polymeric materials and blends useful in the baby bottles of this invention may also contain from 0.01 to 25% by weight of the overall composition common additives such as colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition The polyesters useful in the baby bottles of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally from 0.1 percent by weight to 10 percent by weight, such as 0.1 to 5 percent by weight, based on the total weight of the polyester.

Thermal stabilizers are compounds that stabilize polyesters during polyester manufacture and/or post polymerization, including but not limited to phosphorous compounds including but not limited to phosphoric acid, phosphorous acid, phosphonic acid, phosphinic acid, phosphonous acid, and various esters and salts thereof. These can be present in the polyester compositions useful in the baby bottles of the invention. The esters can be alkyl, branched alkyl, substituted alkyl, difunctional alkyl, alkyl ethers, aryl, and substituted aryl. In one embodiment, the number of ester groups present in the particular phosphorous compound can vary from zero up to the maximum allowable based on the number of hydroxyl groups present on the thermal stabilizer used. The term "thermal stabilizer" is intended to include the reaction product(s) thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

In one embodiment, thermal stabilizers can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkyl-aryl, alkyl-substituted aryl, aryl, substituted aryl, and mixtures thereof. In another embodiment, thermal stabilizers, include but are not limited to, the above described compounds wherein at least one of the hydrogen atoms bonded to an oxygen atom of the compound is replaced with a metallic ion or an ammonium ion.

In one embodiment, the thermal stabilizers include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds comprise at least one thermal stabilizer chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one embodiment, for example, the thermal stabilizers can include at least one phosphate ester.

In another embodiment, the phosphate esters useful in the invention can include but are not limited to alkyl phosphate esters, aryl phosphate esters, mixed alkyl aryl phosphate esters, and/or mixtures thereof.

In certain embodiments, the phosphate esters useful in the invention are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

In one embodiment, the phosphate esters useful as thermal stabilizers in the invention include but are not limited to, at least one of the following: trialkyl phosphates, triaryl phosphates, alkyl diaryl phosphates, and mixed alkyl aryl phosphates.

In one embodiment, the phosphate esters useful as thermal stabilizers in the invention include but are not limited to, at least one of the following: triaryl phosphates, alkyl diaryl phosphates, and mixed alkyl aryl phosphates.

In one embodiment, the phosphate esters useful as thermal stabilizers in the invention include but are not limited to, at least one of the following: triaryl phosphates and mixed alkyl aryl phosphates. In one embodiment, at least one thermal stabilizer comprises, but is not limited to, triaryl phosphates, such as, for example, triphenyl phosphate. In one embodiment, at least one thermal stabilizer comprises, but is not limited to Merpol A.

These bottles include, but are not limited to, injection blow molded bottles, injection stretch blow molded bottles, extrusion blow molded bottles, and extrusion stretch blow molded bottles.

The processes of the invention can include any blow molding processes known in the art including, but not limited to, extrusion blow molding, extrusion stretch blow molding, injection blow molding, and injection stretch blow molding.

This invention intends to include any injection blow molding manufacturing process known in the art. Although not limited thereto, a typical description of injection blow molding (IBM) manufacturing process involves: 1) melting the resin in a reciprocating screw extruder; 2) injecting the molten resin into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This invention intends to include any injection stretch blow molding manufacturing process known in the art. Although not limited thereto, a typical description of injection stretch blow molding (ISBM) manufacturing process involves: 1) melting the resin in a reciprocating screw extruder; 2) injecting the molten resin into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This invention intends to include any extrusion blow molding manufacturing process known in the art. Although not limited thereto, a typical description of extrusion blow molding manufacturing process involves: 1) melting the resin in an extruder; 2) extruding the molten resin through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

This invention also intends to include any blow molded article made using the processes of the invention including but not limited to containers, bottles, and baby bottles.

EXAMPLES

The following examples further illustrate how bottles and articles of the invention can be made and evaluated, and are intended to be purely exemplary of the invention and are not intended to limit the scope thereof. Unless indicated otherwise, parts are parts by weight, temperature is in degrees Celsius or is at room temperature, and pressure is at or near atmospheric.

For the purposes of this invention, the term "wt" means "weight".

The inherent viscosity (I.V.) of the polyesters was determined in 60/40 (wt/wt) phenol/tetrachloroethane at a concentration of 0.5 g/100 ml at 25° C.

Unless stated otherwise, the glass transition temperature (Tg) was determined using a TA DSC 2920 instrument from Thermal Analyst Instruments at a scan rate of 20 C/min according to ASTM D3418. The sample being measured should have been heated above its melting point and quenched prior to the scan.

The glycol content and the cis/trans ratio of polyester compositions used in herein were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol (TMCD) resonances were made by comparison to model mono- and dibenzoate esters of 2,2,4,4-tetramethyl-1,3-cyclobutanediol. These model compounds closely approximate the resonance positions found in the polymers and oligomers.

Several materials with different Tgs were evaluated in this study:

Material A was a Bayer Makrolon polycarbonate. The Tg of the material was measured by DSC to be 146° C.

Material B was a composition measured by NMR to contain 100% terephthalic acid, 49% CHDM and 51% TMCD. The % cis of the TMCD was 54%. The Tg of the material was measured by DSC to be 132° C. The IV of the composition was 0.57 dL/g.

Material C was a composition measured by NMR to contain 100% terephthalic acid, 67% CHDM and 33% TMCD.

The % cis of the TMCD was 52%. The Tg of the material was measured by DSC to be 115° C. The IV of the composition was 0.63 dL/g.

Material D was a composition measured by NMR to contain 100% terephthalic acid, 77% CHDM and 23% TMCD. The % cis of the TMCD was 56%. The Tg of the material was measured by DSC to be 110° C. The IV of the composition was 0.71 dL/g.

Material E was a composition measured by NMR to contain 100% terephthalic acid, 65% CHDM and 35% TMCD. The % cis of the TMCD was 56%. The Tg of the material was measured by DSC to be 110° C. The IV of the composition was 0.71 dL/g.

The bottles prepared in comparative examples 1-9 and examples 1-8 were prepared by a reheat blow molding process. Preforms were first injection molded on a Cincinnati Milacron 150 ton, 6 oz. injection molding machine at a melt temperature of 285° C. The mold temperature was 27° C. and the cycle time was 55 seconds. Several days later, these preforms were blown into bottles on a lab scale, single bottle, reheat blow molding unit. The preforms were reheated with infrared lamps to the temperatures listed in the examples below. Preform temperatures were measured by an infrared pyrometer with its emissivity set at 0.96. The heated preform were transferred to the blow station, allowed to soak for 16 seconds, and then blown using an air pressure of 50 psi.

The following combinations of preforms and bottles were used in this study.

W—a preform 150 mm in length and 29 mm in diameter was blown into a bottle 180 mm in length and 73 mm in diameter to provide a stretch ratio of 3.1.

X—a preform 178 mm in length and 32 mm in diameter was blown into a bottle 180 mm in length and 73 mm in diameter to provide a stretch ratio of 2.3.

Y—a preform 150 mm in length and 29 mm in diameter was blown into a bottle 160 mm in length and 44 mm in diameter to provide a stretch ratio of 1.6.

Z—a preform 150 mm in length and 29 mm in diameter was blown into a bottle 160 mm in length and having a hexagonal cross section with a 38 mm inscribed diameter to provide an average stretch ratio of 1.45.

A day after manufacture, the blown bottles were immersed in boiling water for 1 hour to measure shrinkage. The temperature of the boiling water was measured to be 98.5 C. Volumes of the bottles were measured both before and after immersion. The percent shrinkage was calculated by subtracting the after-immersion volume from the pre-immersion volume and dividing that value by the pre-immersion volume. Shrinkage values of 5% or less can be considered acceptable.

Refractive index values were measured on the bottle sidewalls after they were cut from the bottle. Refractive index was measured using a Metricon Prism Coupler. Birefringence was then calculated from the following equation:

$$\Delta n = \left(\frac{(TE + TEP)}{2}\right) - TM$$

where $\Delta n$ is birefringence, TE is the index of refraction measured in the axial dimension, TEP is the index of refraction measured in the hoop dimension and TM is the index of refraction measured in the thickness dimension. Birefringence could not be measured on eutger bottle Y or the preform since the surface curvature was too severe on these articles.

Haze was determined as follows. First, a bottle was cut in half. One bottle half was maintained as the pre-boil control, and the other bottle half was contacted with human body oil (touched by a finger) and then placed in boiling water for 1 hour. A laser light beam was then transmitted through the sidewall of each half-bottle and its intensity recorded. Transmission was measured by irradiating the sample with a 3 mW HeNe laser and measuring transmitted intensity using a digital photometer. Sample to detector distance was held constant at 8 cm. The transmission ratio was calculated using the ratio of the average transmitted intensity at three exposed locations divided by the average transmitted intensity at two unexposed locations. Exposed location means fingerprint spot, unexposed location is therefore non-fingerprinted spot. This transmission ratio is reported in the table below. Transmission ratio values less than 0.80 corresponded to a noticeable observation of haze.

TABLE 1

Results from the preparation of bottles of the invention

| Example | Mtl | Tg (° C.) | Preform and Bottle | Stretch Ratio | Preform Temp (° C.) | Preform Temp minus Tg (° C.) | Shrinkage (%) | Birefingence | Transmittence Ratio |
|---|---|---|---|---|---|---|---|---|---|
| CEx 1 | A | 146 | W | 3.1 | 171 | 25 | 0 | 0.0181 | — |
| CEx 2 | B | 130 | W | 3.1 | 170 | 40 | 2 | 0.0331 | — |
| CEx 3 | C | 115 | W | 3.1 | 145 | 30 | 57 | 0.0408 | <0.3 |
| CEx 4 | C | 115 | W | 3.1 | 155 | 40 | 42 | 0.0395 | <0.3 |
| CEx 5 | C | 115 | X | 2.3 | 128 | 13 | 26 | 0.0370 | <0.3 |
| CEx 6 | C | 115 | X | 2.3 | 145 | 30 | 14 | 0.0226 | <0.3 |
| CEx 7 | C | 115 | X | 2.3 | 160 | 45 | 5 | 0.0133 | 0.71 |
| Ex 1 | C | 115 | X | 2.3 | 180 | 65 | 2 | 0.0097 | 0.84 |
| CEx 8 | C | 115 | Y | 1.6 | 134 | 19 | 7 | — | 0.38 |
| CEx 9 | C | 115 | Y | 1.6 | 140 | 25 | 4 | — | 0.45 |
| Ex 2 | C | 115 | Y | 1.6 | 150 | 35 | 2 | — | 0.80 |
| Ex 3 | C | 115 | Y | 1.6 | 160 | 45 | 1 | — | 0.89 |
| Ex 4 | C | 115 | Y | 1.6 | 170 | 55 | 1 | — | 0.90 |
| CEx 10 | D | 110 | Y | 1.6 | 142 | 32 | 11 | — | 0.79 |
| CEx 11 | D | 110 | Y | 1.6 | 150 | 40 | 6 | — | 0.75 |
| Ex 5 | D | 110 | Y | 1.6 | 160 | 50 | 4 | — | 0.99 |
| Ex 6 | D | 110 | Y | 1.6 | 168 | 58 | 3 | — | 0.95 |
| Ex 7 | E | 120 | Z | 1.45 | 140 | 20 | 2 | 0.0183 | 0.92 |
| Ex 8 | E | 120 | Z | 1.45 | 150 | 30 | 1 | 0.0141 | 0.98 |
| Ex 9 | E | 120 | Z | 1.45 | 160 | 40 | 1 | 0.0117 | 0.97 |

TABLE 1-continued

Results from the preparation of bottles of the invention

| Example | Mtl | Tg (°C.) | Preform and Bottle | Stretch Ratio | Preform Temp (°C.) | Preform Temp minus Tg (°C.) | Shrinkage (%) | Birefingence | Transmittence Ratio |
|---|---|---|---|---|---|---|---|---|---|
| Ex 10 | C | 115 | Z | 1.45 | 135 | 20 | 4 | 0.0163 | 0.99 |
| Ex 11 | C | 115 | Z | 1.45 | 140 | 25 | 3 | 0.0173 | 1.00 |
| Ex 12 | C | 115 | Z | 1.45 | 150 | 35 | 2 | 0.0124 | 1.00 |
| Ex 13 | C | 115 | Z | 1.45 | 160 | 45 | 1 | 0.0109 | 1.00 |
| CEx 12 | D | 110 | Z | 1.45 | 135 | 25 | 14 | 0.0172 | 0.99 |
| CEx 13 | D | 110 | Z | 1.45 | 140 | 30 | 10 | 0.0145 | 1.00 |
| Ex 14 | D | 110 | Z | 1.45 | 150 | 40 | 5 | 0.0115 | 1.00 |
| Ex 15 | D | 110 | Z | 1.45 | 160 | 50 | 3 | 0.0106 | 0.98 |
| Ex 16 | C | 115 | Preform | 1.0 | n/a | n/a | <1 | — | — |
| Ex 17 | D | 110 | Preform | 1.0 | n/a | n/a | <1 | — | — |

In the following examples, the effect of blow air pressure was examined. The bottles in Comparative Examples 1-5 and Examples 1-8 were prepared by a reheat blow molding process. Preforms were first injection molded from Material C on a Cincinnati Milacron 150 ton, 6 oz. injection molding machine at a melt temperature of 285 C. The mold temperature was 27° C. and the cycle time was 55 seconds. Several days later, these preforms were blown into bottles on a lab scale, single bottle, reheat blow molding unit. The preforms were reheated with infrared lamps to a temperature of 150° C. Preform temperatures were measured by an infrared pyrometer with its emissivity set at 0.96. The heated preform were transferred to the blow station, allowed to soak for 16 seconds, and then blown using air pressures shown below. Preform and bottle combination Y was used for these experiments. These examples show that lower blow pressures produce less orientation and shrinkage.

| Example | Blow Pressure (psi) | Shrinkage (%) |
|---|---|---|
| Ex 19 | 25 | 1.3% |
| Ex 20 | 50 | 1.4% |
| Ex 21 | 75 | 2.3% |

The invention has been described in detail with reference to the embodiments disclosed herein, but it will be understood that variations and modifications can be effected within the spirit and scope of the invention.

We claim:

1. A process for making a baby bottle comprising blow molding a preform made from a polymeric material,
    wherein the polymeric material comprises a polyester material comprising terephthalic acid residues, 2,2,4,4,-tetramethyl-1,3-cyclobutanediol residues and 1,4-cyclohexanedimethanol residues,
    wherein the preform temperature at the time of inflation is greater than a calculated preform temperature (CPT) determined by the following equation: CPT=(45.44)(SR)−(3.36)(Tg)+454, and is in a range from 150° C. to 220° C.,
    wherein the stretch ratio (SR) of the baby bottle with respect to the preform is 3.0× or less;
    wherein the Tg of the polymeric material is from 100° C. to 130° C.; and
    wherein the baby bottle displays shrinkage of 5% or less after immersion in boiling water for one hour.

2. A process according to claim 1, wherein the polyester composition comprises:
    (I) at least one polyester, which comprises
        (a) a dicarboxylic acid component comprising:
            i) 70 to 100 mole % of terephthalic acid residues;
            ii) 0 to 30 mole % of aromatic dicarboxylic acid residues having up to 20 carbon atoms; and
            iii) 0 to 10 mole % of aliphatic dicarboxylic acid residues having up to 16 carbon atoms; and
        (b) a glycol component comprising:
            i) 10 to 50 mole % of 2,2,4,4-tetramethyl-1,3-cyclobutanediol residues; and
            ii) 50 to 90 mole % of 1,4-cyclohexanedimethanol residues,
    wherein the total mole % of the dicarboxylic acid component is 100 mole %, and the total mole ° A) of the glycol component is 100 mole %;
    wherein the inherent viscosity of the polyester is from 0.45 to 1.0 dL/g as determined in 60/40 (wt/wt) phenol/tetrachloroethane at a concentration of 0.5 g/100 ml at 25° C.

3. A process according to claim 2,
    wherein the glycol component of the polyester composition comprises 20 to 45 mole % of 2,2,4,4-tetramethyl-1,3-cyclobutanediol residues; and 65 to 80 mole % of 1,4-cyclohexanedimethanol residues;
    wherein the inherent viscosity of the polyester is from 0.55 to 0.80 dL/g as determined in 60/40 (wt/wt) phenol/tetrachloroethane at a concentration of 0.5 g/100 ml at 25° C.; and
    wherein the polyester has a Tg of from 105 to 125° C.

4. A process according to claim 2,
    wherein the glycol component of the polyester composition comprises 30 to 40 mole % of 2,2,4,4-tetramethyl-1,3-cyclobutanediol residues; and 60 to 70 mole % of 1,4-cyclohexanedimethanol residues;
    wherein the inherent viscosity of the polyester is from 0.58 to 0.74 dL/g as determined in 60/40 (wt/wt) phenol/tetrachloroethane at a concentration of 0.5 g/100 ml at 25° C.; and
    wherein the polyester has a Tg of from 115 to 125° C.

5. A process according to claim 2,
    wherein the glycol component of the polyester composition comprises 33 to 37 mole % of 2,2,4,4-tetramethyl-1,3-cyclobutanediol residues; and 63 to 67 mole % of 1,4-cyclohexanedimethanol residues;
    wherein the inherent viscosity of the polyester is from 0.60 to 0.68 dL/g as determined in 60/40 (wt/wt) phenol/tetrachloroethane at a concentration of 0.5 g/100 ml at 25° C.; and
    wherein the polyester has a Tg of from 118 to 122° C.

6. A process according to claim 1, wherein the preform is blow molded into a bottle at a pressure from 1 to 75 psi.

7. A process according to claim 1, wherein the preform is blow molded into a bottle at a pressure from 1 to 40 psi.

8. A process according to claim 1, wherein the preform is blow molded into a bottle at a pressure from 3 to 20 psi.

9. A process according to claim 1, wherein the stretch ratio of the bottle with respect to the preform is from 1.2× to 3.0×.

10. A process according to claim 1, wherein the stretch ratio of the bottle with respect to the preform is from 1.2× to 2.5×.

11. A process according to claim 1, wherein the stretch ratio of the bottle with respect to the preform is from 1.2× to 2.0×.

12. A process according to claim 1, wherein the stretch ratio of the bottle with respect to the preform is from 1.3× to 1.7×.

13. A process according to claim 1, wherein the Tg of the polymeric material is from 105° C. to 130° C.

14. A process according to claim 1, wherein the Tg of the polymeric material is from 105° C. to 125° C.

15. A process according to claim 1, wherein the Tg of the polymeric material is from 115° C. to 125° C.

16. A process according to claim 1, wherein the baby bottle has a shrinkage of 4% or less after immersion in boiling water for one hour.

17. A process according to claim 1, wherein the baby bottle has a shrinkage of 3% or less after immersion in boiling water for one hour.

18. A process according to claim 1, wherein the baby bottle has a shrinkage of 2% or less after immersion in boiling water for one hour.

19. A process according to claim 1, wherein the baby bottle has a shrinkage of 1% or less after immersion in boiling water for one hour.

20. A process according to claim 1, wherein a side wall of the baby bottle has a transmission ratio of 0.80 or greater after immersion in boiling water for one hour.

21. A process according to claim 1, wherein a side wall of the baby bottle has a transmission ratio of 0.85 or greater after immersion in boiling water for one hour.

22. A process according to claim 1, wherein a side wall of the baby bottle has a transmission ratio of 0.90 or greater after immersion in boiling water for one hour.

23. A process according to claim 1, wherein a side wall of the baby bottle has a transmission ratio of 0.95 or greater after immersion in boiling water for one hour.

24. A process according to claim 1, wherein a side wall of the baby bottle has a birefringence of 0.02 or less.

25. A process according to claim 1, wherein a side wall of the baby bottle has a birefringence of 0.015 or less.

26. A process according to claim 1, wherein a side wall of the baby bottle has a birefringence of 0.01 or less.

27. A process for making a baby bottle comprising blow molding a preform made from a polyester composition,
wherein the preform temperature at the time of inflation is greater than a calculated preform temperature (CPT) determined by the following equation: CPT=(45.44)(SR)−(3.36)(Tg)+454, and is in a range from 150° C. to 200° C.;
wherein the preform is blow molded into a bottle at a pressure from 1 to 40 psi and at an inflation rate from 10 cm³/s to 200 cm³/s;
wherein the stretch ratio (SR) of the baby bottle with respect to the preform is from 1.2× to 2.5×;
wherein the Tg of the polyester composition is from 105° C. to 125° C.;
wherein the baby bottle displays shrinkage of 5% or less after immersion in boiling water for one hour;
wherein the polyester composition comprises:
(I) at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 30 to 40 mole % of 2,2,4,4-tetramethyl-1,3-cyclobutanediol residues; and
    ii) 60 to 70 mole % of 1,4-cyclohexanedimethanol residues,
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

28. The blow molding process according to claim 1 wherein the preform is blow molded at an inflation rate from 5 cm³/s to 750 cm³/s.

29. The blow molding process according to claim 1 wherein the preform is blow molded at an inflation rate from 10 cm³/s to 200 cm³/s.

30. The blow molding process according to claim 1 wherein the preform is blow molded at an inflation rate from 30 cm³/s to 100 cm³/s.

* * * * *